(12) United States Patent
Sheridon

(10) Patent No.: US 6,970,154 B2
(45) Date of Patent: Nov. 29, 2005

(54) FRINGE-FIELD FILTER FOR ADDRESSABLE DISPLAYS

(75) Inventor: Nicholas K. Sheridon, Los Altos, CA (US)

(73) Assignee: JPMorgan Chase Bank, Houston, TX (US)

( * ) Notice: Subject to any disclaimer, the term of this patent is extended or adjusted under 35 U.S.C. 154(b) by 656 days.

(21) Appl. No.: 09/757,538

(22) Filed: Jan. 11, 2001

(65) Prior Publication Data

US 2002/0089475 A1 Jul. 11, 2002

(51) Int. Cl.⁷ ................................................ G09G 3/34
(52) U.S. Cl. .......................... 345/107; 345/84; 345/179; 345/204
(58) Field of Search .......................... 345/84, 107, 179, 345/204

(56) References Cited

U.S. PATENT DOCUMENTS

| | | | |
|---|---|---|---|
| 2,326,634 A | 8/1943 | Gebhard et al. ................ | 88/82 |
| 2,354,018 A | 7/1944 | Heltzer et al. ................. | 88/82 |
| 2,354,048 A | 7/1944 | Palmquist .................... | 40/135 |
| 2,354,049 A | 7/1944 | Palmquist .................... | 40/135 |
| 2,407,680 A | 9/1946 | Palmquist et al. ............. | 88/82 |
| 2,600,963 A | 6/1952 | Bland .......................... | 49/58 |
| 2,684,788 A | 7/1954 | Bland .......................... | 222/177 |
| 2,794,301 A | 6/1957 | Law et al. ..................... | 49/84 |
| 2,950,985 A | 8/1960 | d'Adrian ..................... | 117/33 |
| 2,965,921 A | 12/1960 | Bland .......................... | 18/2.5 |
| 2,980,547 A | 4/1961 | d'Adrian ..................... | 106/47 |
| 3,034,177 A | 5/1962 | Hooper ......................... | 18/40 |
| 3,036,388 A | 5/1962 | Tate ............................. | 35/66 |
| 3,063,388 A | 11/1962 | Magarian et al. ............. | 105/376 |
| RE25,363 E | 4/1963 | Tate ............................. | 35/66 |
| 3,150,947 A | 9/1964 | Bland ........................... | 65/21 |
| 3,222,204 A | 12/1965 | Weber et al. .................. | 117/27 |

(Continued)

FOREIGN PATENT DOCUMENTS

| | | | |
|---|---|---|---|
| GB | 1578460 | 11/1980 | ............ G09F/9/37 |
| WO | WO 98/03896 | 1/1998 | |
| WO | WO 99/107967 | 1/1998 | |
| WO | WO 98/41899 | 9/1998 | |

OTHER PUBLICATIONS

EPO Search Report, Application No. EP 02 25 0115 (Dec. 3, 2003) (3 pages).

"Xerox PARC and 3M to collaborate on electronic paper," Information Today, vol. 16, No. 8, Sep. 1999.

Gibbs, "The Reinvention of Paper," Scientific American: Technology and Business, Sep. 1998.

(Continued)

*Primary Examiner*—Steven Saras
*Assistant Examiner*—Fritz Alphonse

(57) ABSTRACT

The display kit of the present invention comprises: an addressable display medium configured to exhibit a first aspect under the influence of an addressing vector field in a first direction at an addressing magnitude; and an addressor; where the addressor is configured to provide the addressing vector field in the first direction at the addressing magnitude to a portion of the display medium; and a filter comprising: a first sheet electrode and a second sheet electrode configured to exhibit a first vector field in the first direction at a first magnitude to the portion of the display medium; where the first magnitude is less than the addressing magnitude; where the display medium is located between the first sheet electrode and the second sheet electrode; and where the first sheet electrode is between the addressor and the display medium.

22 Claims, 13 Drawing Sheets

U.S. PATENT DOCUMENTS

| | | |
|---|---|---|
| 3,243,273 A | 3/1966 | Bland ............................ 65/21 |
| 3,310,391 A | 3/1967 | Law ............................... 65/21 |
| 3,406,363 A | 10/1968 | Tate ............................ 335/302 |
| 3,594,065 A | 7/1971 | Marks ......................... 350/160 |
| 3,615,993 A | 10/1971 | French ......................... 156/155 |
| 3,617,333 A | 11/1971 | Brown .......................... 117/35 |
| 3,648,281 A | 3/1972 | Dahms et al. ............... 340/373 |
| 3,670,323 A | 6/1972 | Sobel et al. ................. 340/324 |
| 3,795,435 A | 3/1974 | Schwab ...................... 350/105 |
| 3,915,771 A | 10/1975 | Gatzke et al. ................ 156/71 |
| 3,982,334 A | 9/1976 | Tate ............................... 35/66 |
| 4,001,140 A | 1/1977 | Foris et al. .................. 252/316 |
| 4,002,022 A | 1/1977 | Lopez C. ...................... 58/126 |
| 4,082,426 A | 4/1978 | Brown ......................... 350/105 |
| RE29,742 E | 8/1978 | Tung ............................. 2/412 |
| 4,117,192 A | 9/1978 | Jorgensen .................... 428/337 |
| 4,117,194 A | 9/1978 | Barbe et al. ................. 428/374 |
| 4,126,854 A | 11/1978 | Sheridon ...................... 340/373 |
| 4,143,103 A | 3/1979 | Sheridon ......................... 264/4 |
| 4,143,472 A | 3/1979 | Murata et al. .................. 35/66 |
| 4,229,732 A | 10/1980 | Hartstein et al. ......... 340/378.2 |
| 4,232,084 A | 11/1980 | Tate ............................ 428/309 |
| 4,253,909 A | 3/1981 | Lee .............................. 156/654 |
| 4,256,677 A | 3/1981 | Lee ................................. 264/8 |
| 4,261,653 A | 4/1981 | Goodrich ..................... 350/362 |
| 4,267,946 A | 5/1981 | Thatcher ...................... 222/345 |
| 4,268,413 A | 5/1981 | Dabisch ....................... 252/408 |
| 4,273,672 A | 6/1981 | Vassiliades .................. 252/316 |
| 4,283,438 A | 8/1981 | Lee ............................... 427/47 |
| 4,288,788 A | 9/1981 | Rogers et al. ............ 340/378.2 |
| 4,299,880 A | 11/1981 | Arens .......................... 428/304 |
| 4,367,920 A | 1/1983 | Tung et al. .................. 350/105 |
| 4,368,952 A | 1/1983 | Murata et al. ............... 350/362 |
| 4,374,889 A | 2/1983 | Arens .......................... 428/207 |
| 4,381,616 A | 5/1983 | Saxer ............................ 40/502 |
| 4,402,062 A | 8/1983 | Batchelder .................. 365/153 |
| 4,411,973 A | 10/1983 | Gilmour et al. ................ 430/7 |
| 4,417,543 A | 11/1983 | Lee .............................. 118/620 |
| 4,418,098 A | 11/1983 | Maistrovich ................ 427/161 |
| 4,418,346 A | 11/1983 | Batchelder .................. 340/787 |
| 4,419,383 A | 12/1983 | Lee ............................... 427/47 |
| 4,438,160 A | 3/1984 | Ishikawa et al. ............ 427/214 |
| 4,441,791 A | 4/1984 | Hornbeck .................... 350/360 |
| 4,457,723 A | 7/1984 | Tate ............................ 434/409 |
| 4,492,435 A | 1/1985 | Banton et al. ............... 350/360 |
| 4,500,172 A | 2/1985 | Gagnon et al. ......... 350/331 R |
| 4,511,210 A | 4/1985 | Tung et al. .................. 350/105 |
| 4,532,608 A | 7/1985 | Wu .............................. 365/127 |
| 4,569,857 A | 2/1986 | Tung et al. .................. 427/163 |
| 4,592,628 A | 6/1986 | Altman et al. ............... 350/486 |
| 4,627,689 A | 12/1986 | Asher .......................... 350/362 |
| 4,632,517 A | 12/1986 | Asher .......................... 350/362 |
| 4,657,349 A | 4/1987 | Labes et al. ................. 350/362 |
| 4,675,476 A | 6/1987 | Kobayashi .................... 178/18 |
| 4,678,695 A | 7/1987 | Tung et al. .................. 428/120 |
| 4,688,900 A | 8/1987 | Doane et al. ................ 350/347 |
| 4,695,528 A | 9/1987 | Dabisch et al. ............. 430/290 |
| 4,701,024 A | 10/1987 | Kobayashi et al. ......... 350/331 |
| 4,710,732 A | 12/1987 | Hornbeck .................... 332/7.51 |
| 4,713,295 A | 12/1987 | Laroche ...................... 428/406 |
| 4,721,649 A | 1/1988 | Belisle et al. ............... 428/325 |
| 4,725,494 A | 2/1988 | Belisle et al. ............... 428/325 |
| 4,729,687 A | 3/1988 | Arens .......................... 401/198 |
| 4,740,266 A | 4/1988 | Wu .............................. 156/633 |
| 4,781,789 A | 11/1988 | Wu .............................. 156/633 |
| 4,781,790 A | 11/1988 | Wu .............................. 156/633 |
| 4,783,236 A | 11/1988 | Wu .............................. 156/633 |
| 4,795,243 A | 1/1989 | Suzuki ......................... 350/362 |
| 4,795,528 A | 1/1989 | Wu .............................. 156/633 |
| 4,810,431 A | 3/1989 | Leidner ........................ 264/15 |
| 4,837,071 A | 6/1989 | Tagoku et al. .............. 428/195 |
| 4,877,253 A | 10/1989 | Arens .......................... 273/240 |
| 4,890,902 A | 1/1990 | Doane et al. ............... 350/347 |
| 4,919,521 A | 4/1990 | Tada et al. .................. 350/362 |
| 4,931,019 A | 6/1990 | Park ............................ 434/409 |
| 4,948,232 A | 8/1990 | Lange ......................... 350/334 |
| 4,956,619 A | 9/1990 | Hornbeck .................... 330/4.3 |
| 4,991,941 A | 2/1991 | Kalmanash ................. 350/347 |
| 4,994,204 A | 2/1991 | Doane et al. ........... 252/299.01 |
| 5,006,422 A | 4/1991 | Sakurai et al. .............. 428/694 |
| 5,039,557 A | 8/1991 | White .......................... 427/137 |
| 5,066,559 A | 11/1991 | Elmasry et al. ............. 430/111 |
| 5,075,186 A | 12/1991 | Sheridon ...................... 430/47 |
| 5,128,203 A | 7/1992 | LaRoche ..................... 428/325 |
| 5,131,736 A | 7/1992 | Alvarez ....................... 359/886 |
| 5,151,032 A | 9/1992 | Igawa ......................... 434/409 |
| 5,155,607 A | 10/1992 | Inoue et al. ................... 359/51 |
| 5,157,011 A | 10/1992 | Okabe et al. ............... 503/201 |
| 5,189,658 A | 2/1993 | Moses ......................... 369/100 |
| 5,219,820 A | 6/1993 | Morohoshi et al. ......... 503/204 |
| 5,223,473 A | 6/1993 | Oliver et al. ................ 503/226 |
| 5,226,099 A | 7/1993 | Mignardi et al. ............. 385/19 |
| 5,233,459 A | 8/1993 | Bozler et al. ................ 359/230 |
| 5,249,000 A | 9/1993 | Okabe et al. ............... 346/151 |
| 5,251,048 A | 10/1993 | Doane et al. .................. 359/51 |
| 5,262,098 A | 11/1993 | Crowley et al. ................ 264/8 |
| 5,262,374 A | 11/1993 | Okabe et al. ............... 503/201 |
| 5,270,872 A | 12/1993 | Spry ............................ 359/885 |
| 5,274,460 A | 12/1993 | Yamada et al. ............. 358/296 |
| 5,290,066 A | 3/1994 | Mody .......................... 281/15.1 |
| 5,315,418 A | 5/1994 | Sprague et al. ............... 359/41 |
| 5,315,776 A | 5/1994 | Strawbridge et al. .......... 40/505 |
| 5,331,454 A | 7/1994 | Hornbeck .................... 359/224 |
| 5,344,594 A | 9/1994 | Sheridon ...................... 264/4.1 |
| 5,351,995 A | 10/1994 | Booker ........................ 283/117 |
| 5,354,598 A | 10/1994 | Arens .......................... 428/195 |
| 5,363,222 A | 11/1994 | Ledebuhr ...................... 359/40 |
| 5,383,008 A | 1/1995 | Sheridon ..................... 355/256 |
| 5,384,067 A | 1/1995 | Doane et al. ........... 252/299.01 |
| 5,389,426 A | 2/1995 | Arens et al. ................. 428/195 |
| 5,389,945 A | 2/1995 | Sheridon ....................... 345/85 |
| 5,392,151 A | 2/1995 | Nelson ........................ 359/223 |
| 5,397,503 A | 3/1995 | Yuasa et al. ............ 252/299.01 |
| 5,411,398 A | 5/1995 | Nakanishi et al. .......... 434/409 |
| 5,416,996 A | 5/1995 | Clemens et al. .............. 40/502 |
| 5,432,526 A | 7/1995 | Hyatt ............................ 345/87 |
| 5,432,534 A | 7/1995 | Maruyama et al. ......... 347/172 |
| 5,459,602 A | 10/1995 | Sampsell ..................... 359/234 |
| 5,469,020 A | 11/1995 | Herrick ....................... 313/511 |
| 5,475,401 A | 12/1995 | Verrier et al. ............... 345/179 |
| 5,515,075 A | 5/1996 | Nakagiri et al. ............ 345/111 |
| 5,526,016 A | 6/1996 | Nakagiri et al. ............ 345/111 |
| 5,535,047 A | 7/1996 | Hornbeck .................... 359/295 |
| 5,582,700 A | 12/1996 | Bryning et al. ............. 204/450 |
| 5,604,027 A | 2/1997 | Sheridon ..................... 428/323 |
| 5,627,562 A | 5/1997 | Skodlar ....................... 345/111 |
| 5,659,330 A | 8/1997 | Sheridon ....................... 345/84 |
| 5,667,924 A | 9/1997 | Ziolo ............................ 430/39 |
| 5,703,671 A | 12/1997 | Narita et al. .................. 355/32 |
| 5,708,525 A | 1/1998 | Sheridon ..................... 359/296 |
| 5,717,283 A | 2/1998 | Biegelsen et al. ........... 313/483 |
| 5,717,514 A | 2/1998 | Sheridon ..................... 359/296 |
| 5,717,515 A | 2/1998 | Sheridon ..................... 359/296 |
| 5,723,204 A | 3/1998 | Stefik .......................... 428/206 |
| 5,724,064 A | 3/1998 | Stefik et al. ................. 345/105 |
| 5,731,792 A | 3/1998 | Sheridon ....................... 345/84 |
| 5,737,115 A | 4/1998 | Mackinlay et al. ......... 359/296 |
| 5,739,801 A | 4/1998 | Sheridon ....................... 345/84 |
| 5,739,946 A | 4/1998 | Iwanaga et al. ............. 359/296 |
| 5,751,268 A | 5/1998 | Sheridon ..................... 345/107 |
| 5,754,332 A | 5/1998 | Crowley ...................... 359/296 |

| Patent | Date | Inventor | Class |
|---|---|---|---|
| 5,757,345 A | 5/1998 | Sheridon | 345/84 |
| 5,760,761 A | 6/1998 | Sheridon | 345/107 |
| 5,767,826 A | 6/1998 | Sheridon et al. | 345/84 |
| 5,777,782 A | 7/1998 | Sheridon | 359/296 |
| 5,784,189 A | 7/1998 | Bozler et al. | 359/254 |
| 5,808,593 A | 9/1998 | Sheridon | 345/84 |
| 5,808,783 A | 9/1998 | Crowley | 359/296 |
| 5,815,306 A | 9/1998 | Sheridon et al. | 359/296 |
| 5,821,624 A | 10/1998 | Pasch | 257/776 |
| 5,825,529 A | 10/1998 | Crowley | 359/296 |
| 5,828,441 A | 10/1998 | Narita et al. | 355/32 |
| 5,866,284 A | 2/1999 | Vincent | 430/37 |
| 5,869,929 A | 2/1999 | Eida et al. | 313/501 |
| 5,877,844 A | 3/1999 | Matsumoto | 355/35 |
| 5,891,479 A | 4/1999 | Sheridon | 425/8 |
| 5,892,497 A | 4/1999 | Robertson | 345/107 |
| 5,893,206 A | 4/1999 | Furlani et al. | 29/608 |
| 5,894,367 A | 4/1999 | Sheridon | 359/623 |
| 5,900,192 A | 5/1999 | Richley | 264/8 |
| 5,900,858 A | 5/1999 | Richley | 345/107 |
| 5,904,790 A | 5/1999 | Sheridon | 156/83 |
| 5,906,743 A | 5/1999 | Cohen et al. | 210/502.1 |
| 5,914,805 A | 6/1999 | Crowley | 359/296 |
| 5,917,646 A | 6/1999 | Sheridon | 359/296 |
| 5,919,409 A | 7/1999 | Sheridon | 264/8 |
| 5,922,268 A | 7/1999 | Sheridon | 264/437 |
| 5,930,026 A | 7/1999 | Jacobson et al. | 359/296 |
| 5,940,054 A | 8/1999 | Harris | 345/85 |
| 5,956,005 A | 9/1999 | Sheridon | 345/84 |
| 5,961,804 A | 10/1999 | Jacobson et al. | 204/606 |
| 5,969,472 A | 10/1999 | Kisner | 313/484 |
| 5,972,493 A | 10/1999 | Iwasaki et al. | 428/323 |
| 5,974,901 A | 11/1999 | Zborowski et al. | 73/865.5 |
| 5,975,680 A | 11/1999 | Wen et al. | 347/43 |
| 5,976,428 A | 11/1999 | Richley | 264/10 |
| 5,982,346 A | 11/1999 | Sheridon et al. | 345/85 |
| 5,986,629 A | 11/1999 | Smith et al. | 345/84 |
| 5,989,629 A | 11/1999 | Sacripante et al. | 427/180 |
| 6,014,116 A | 1/2000 | Haynes et al. | 345/1 |
| 6,014,247 A | 1/2000 | Winter et al. | 359/296 |
| 6,017,584 A | 1/2000 | Albert et al. | 427/213.3 |
| 6,034,807 A | 3/2000 | Little et al. | 359/227 |
| 6,038,059 A | 3/2000 | Silverman | 359/296 |
| 6,054,071 A | 4/2000 | Mikkelsen, Jr. | 264/1.36 |
| 6,054,809 A | 4/2000 | Haynes et al. | 313/505 |
| 6,055,091 A | 4/2000 | Sheridon et al. | 359/296 |
| 6,067,185 A | 5/2000 | Albert et al. | 359/296 |
| 6,072,621 A | 6/2000 | Kishi et al. | 359/296 |
| 6,097,531 A | 8/2000 | Sheridon | 359/296 |
| 6,110,538 A | 8/2000 | Sheridon | 427/457 |
| 6,118,419 A | 9/2000 | Smith et al. | 345/84 |
| 6,120,588 A | 9/2000 | Jacobson | 106/31.16 |
| 6,120,839 A | 9/2000 | Silverman | 359/213.3 |
| 6,122,094 A | 9/2000 | Comiskey et al. | 427/213.3 |
| 6,128,124 A | 10/2000 | Silverman | 359/296 |
| 6,130,773 A | 10/2000 | Jacobson et al. | 359/296 |
| 6,137,467 A | 10/2000 | Sheridon et al. | 345/107 |
| 6,147,791 A | 11/2000 | Sheridon | 359/296 |
| 6,162,321 A | 12/2000 | Silverman | 156/276 |
| 6,174,153 B1 | 1/2001 | Sheridon | 425/3 |
| RE37,085 E | 3/2001 | Sheridon | 428/323 |
| 6,196,848 B1 | 3/2001 | Yamazaki | 434/409 |
| 6,197,228 B1 | 3/2001 | Sheridon | 264/1.36 |
| 6,211,998 B1 | 4/2001 | Sheridon | 359/296 |
| 6,222,513 B1 | 4/2001 | Howard et al. | 345/84 |
| 6,243,058 B1 | 6/2001 | Mikkelsen et al. | 345/84 |
| 6,251,329 B1 | 6/2001 | Sheridon | 264/427 |
| 6,383,619 B1 | 5/2002 | Engler et al. | 428/212 |
| 6,396,621 B1 | 5/2002 | Sheridon | 359/296 |
| 6,421,035 B1 | 7/2002 | Sheridon et al. | 345/85 |
| 6,428,868 B1 | 8/2002 | Sheridon et al. | 428/40.2 |
| 6,441,946 B1 | 8/2002 | Sheridon | 359/296 |
| 6,473,072 B1 * | 10/2002 | Comiskey et al. | 345/173 |
| 6,480,322 B2 | 11/2002 | Engler et al. | 359/296 |
| 6,485,280 B1 | 11/2002 | Richley | 425/8 |
| 6,487,002 B1 | 11/2002 | Biegelsen | 359/296 |
| 6,518,948 B1 * | 2/2003 | Berstis | 345/55 |
| 6,521,145 B1 | 2/2003 | Engler et al. | 264/1.9 |
| 6,524,500 B2 | 2/2003 | Sheridon et al. | 264/1.7 |
| 6,531,997 B1 * | 3/2003 | Gates et al. | 345/107 |
| 6,549,327 B2 | 4/2003 | Foucher et al. | 359/296 |
| 6,556,470 B1 | 4/2003 | Vincent et al. | 365/151 |
| 6,559,820 B1 | 5/2003 | Mikkelsen, Jr. et al. | 345/84 |
| 6,570,700 B2 | 5/2003 | Engler et al. | 359/296 |
| 6,573,880 B1 | 6/2003 | Simoni et al. | 345/87 |
| 6,577,432 B2 | 6/2003 | Engler et al. | 359/296 |
| 6,588,131 B2 | 7/2003 | O'Connell, Jr. | 40/446 |
| 2002/0084539 A1 | 7/2002 | Sheridon et al. | 264/4 |
| 2002/0089486 A1 | 7/2002 | Sheridon | 345/107 |
| 2002/0089490 A1 | 7/2002 | Sheridon | 345/173 |
| 2002/0130831 A1 | 9/2002 | Engler et al. | 345/107 |
| 2002/0131148 A1 | 9/2002 | Engler et al. | 359/296 |
| 2002/0131149 A1 | 9/2002 | Engler et al. | 359/296 |
| 2002/0131150 A1 | 9/2002 | Engler et al. | 359/296 |
| 2002/0131151 A1 | 9/2002 | Engler et al. | 359/296 |
| 2002/0186197 A1 | 12/2002 | Biegelsen | 345/107 |
| 2002/0186450 A1 | 12/2002 | Foucher et al. | 359/296 |
| 2002/0186452 A1 | 12/2002 | Biegelsen | 359/296 |
| 2003/0046838 A1 | 3/2003 | O'Connell, Jr. | 40/452 |

OTHER PUBLICATIONS

Mattis, "Screen Saviours," Business 2.0, Jul. 1999.

Mann, "Who will own your next good idea?" The Atlantic Monthly, Sep. 1998, vol. 282, pp. 57–82.

Comiskey et al., "An electrophoretic ink for all–printed reflective electronic displays," Nature, Jul. 16, 1998, vol. 394, pp. 253–255.

Klein, "Will the future be written in E–ink?" The Wall Street Journal, Jan. 4, 2000.

Wisnieff, "Printing Screens," Nature, Jul. 16, 1998, vol. 394, Issue No. 6690, pp. 225 and 227.

L.L. Lee, "A Magnetic–Particles Display," IEEE Transactions on Electron Devices, vol. ED–22, No. 9, Sep. 1975, pp. 758–765.

L.L. Lee, "Fabrication of Magnetic Particles Displays," Proceeding of the S.I.D., vol. 18/3 & 4 1977, pp. 283–288.

Comiskey et al., "Electrophoretic Ink: A printable Display Material," SID 97 Digest, pp. 75–76 (1997).

I. Ota, et al., IEEE Conference on Display Devices, 72 CH 0707–0–ED 1972, pp. 46–49.

* cited by examiner

FRINGE-FIELD FILTER FOR ADDRESSABLE DISPLAYS

RELATED APPLICATIONS

The following identified United States patent applications are relied upon and are fully incorporated herein by reference:

U.S. patent application entitled "Rotating element sheet material with dual vector field addressing," by Nicholas K. Sheridon, filed on Jan. 11, 2001, and accorded Ser. No. 09/757,539.

U.S. patent application entitled "Rotating element sheet material with dual vector field addressing," by Nicholas K. Sheridon, filed on Jan. 11, 2001, and accorded Ser. No. 09/757,531.

INCORPORATION BY REFERENCE

The following U.S. patents are herein fully incorporated by reference:

U.S. Pat. No. 4,126,854 by Sheridon entitled "Twisting Ball Panel Display,"

U.S. Pat. No. 4,143,103 by Sheridon entitled "Method Of Making A Twisting Ball Panel Display;"

U.S. Pat. No. 5,262,098 by Crowley el al entitled "Method And Apparatus For Fabricating Bichromal Balls For A Twisting Ball Display;"

U.S. Pat. No. 5,344,594, by Shendon entitled "Method For The Fabrication Of Multicolored Balls For A Twisting Ball Display;"

U.S. Pat. No. 5,389,945, by Shendon entitled "Writing System Including Paper-Like Digitally Addressed Media and Addressing Device Therefor;"

U.S. Pat. No. 5,604,027 by Sheridon entitled "Some Uses Of Microencapsulalion For Electric Paper;"

U.S. Pat. No. 5,717,514 by Shendon entitled "Polychromal Segmented Bails For A Twisting Ball Display;"

U.S. Pat. No. 5,767,826 by Shendon el al. entitled "Subtractive Color Twisting Ball Display;"

U.S. Pat. No. 5,777,782 by Sheridon entitled "Auxiliary Optics For A Twisting Ball Display;"

U.S. Pat. No. 5,894,367 by Sheridon entitled "Twisting Cylinder Display Using Multiple Chromatic Values;"

U.S. Pat. No. 6,055,091 by Sheridon et al, entitled "Twisting Cylinder Display;"

U.S. Pat. No. 6,097,531 by Sheridon entitled "Method Of Making Uniformly Magnetized Elements For A Gyncon Display;"

U.S. Pat. No. 6,110,538 by Sheridon entitled "A Method Of Making A Gyncon Display Using Magnetic Latching;"

U.S. patent application Ser. No. 08/960,865 by Sheridon et ai entitled "Twisting Cylinder Display;"

U.S. Pat. No. 6,222,513 by Howard et al. entitled "Charge Retention Islands for Electric Paper And Applications Thereof;"

U.S. patent application Ser. No. 09/199,544 by Sheridon entitled "Gyncon Displays Utilizing Rotating Elements And Magnetic Latching;"

U.S. patent application Ser. No. 09/200,553 by Shendon entitled "Gyricon Displays Utilizing Magnetic Elements And Magnetic Trapping;"

U.S. Pat. No. 6,174,153 by Sheridon entitled "An Apparatus For Making Uniformly Magnetized Elements For A Gyricon Display;"

U.S. Pat. No. 6,174,153 by Sheridon entitled "An Apparatus For Making Uniformly Magnetized Elements For A Gyricon Display;"

U.S. Pat. No. 6,251,329 by Sheridon entitled "A Method Of Making A Gyricon Display Using Magnetic Latching;"

U.S. Pat. No. 6,197,228 by Sheridon entitled "A Method Of Making A Gyricon Display Using Magnetic Latching;"

U.S. Pat. No. 6,211,998 by Sheridon entitled "Magnetic Unlatching And Addressing Of A Gyricon Display;"

U.S. patent application Ser. No. 09/465,801 by Biegelsen et al entitled "System and method for rotatable element assembly and laminate substrate assembly;"

U.S. patent application Ser. No. 09/563,504 by Knights entitled "Rotating element sheet material with microstructured substrate and method of use;"

U.S. patent application Ser. No. 09/549,518 by Sheridon entitled "Rotating element sheet material with generalized containment structure;"

U.S. patent application Ser. No. 09/517,522 by Silverman entitled "Rotating element sheet material with reversible highlighting;" and U.S. patent application Ser. No. 09/643,670 by Kazmaier et al entitled "Electromagnetophoretic display system and method."

I. FIELD OF THE INVENTION

The present invention relates to a system for addressable displays that decreases the fringing effect of an addressing vector field. More particularly, the present invention relates to the use of sheet electrodes incorporated into rotating element sheet material, addressed with a stylus, in order to produce a saturated aspect.

II. BACKGROUND OF THE INVENTION

Rotating element sheet material has been disclosed in U.S. Pat. Nos. 4,126,854 and 4,143,103, both hereinabove incorporated by reference, and generally comprises a substrate, an enabling fluid, and a class of rotatable elements. As discussed more below, rotating element sheet material has found a use as "reusable electric paper." FIG. 1 depicts an enlarged section of rotating element sheet material 50, including rotatable element 10, enabling fluid 20, cavity 30, and substrate 40. Observer 60 is also shown. Although FIG. 1 depicts a spherically shaped rotatable element and cavity, many other shapes will work and are consistent with the present invention. As disclosed in U.S. Pat. No. 5,389,945, herein incorporated by reference, the thickness of substrate 40 may be of the order of hundreds of microns, and the dimensions of rotatable element 10 and cavity 30 may be of the order of 10 to 100 microns.

In FIG. 1, substrate 40 is an elastomer material, such as silicone rubber, that accommodates both enabling fluid 20 and the class of rotatable elements within a cavity or cavities disposed throughout substrate 40. The cavity or cavities contain both enabling fluid 20 and the class of rotatable elements such that rotatable element 10 is in contact with enabling fluid 20 and at least one translational degree of freedom of rotatable element 10 is restricted. The contact between enabling fluid 20 and rotatable element 10 breaks a symmetry of rotatable element 10 and allows rotatable element 10 to be addressed. The state of broken symmetry of rotatable element 10, or addressing polarity, can be the establishment of an electric dipole about an axis of rotation. For example, it is well known that small particles in a dielectric liquid acquire an electrical charge that is related to the Zeta potential of the surface coating. Thus, an electric dipole can be established on a rotatable element in a dielectric liquid by the suitable choice of coatings applied to opposing surfaces of the rotatable element about an axis of rotation.

The use of rotating element sheet material as "reusable electric paper" is due to that fact that the rotatable elements are typically given a second broken symmetry, a multivalued aspect, correlated with the addressing polarity discussed above. That is, the above-mentioned coatings may be chosen so as to respond to incident electromagnetic energy in distinguishable ways, as indicated in FIG. 2, for example. Thus, an applied vector field can control the aspect of rotatable element 10 to favorably situated observer 60.

For example, as disclosed in U.S. Pat. No. 4,126,854, hereinabove incorporated by reference, rotatable element 10 may comprise a black polyethylene generally spherical body with titanium oxide sputtered on one hemisphere, where the titanium oxide provides a light-colored aspect in one orientation. Such a rotatable element in a transparent dielectric liquid will exhibit the desired addressing polarity as well as the desired aspect.

II.A. Rotatable Elements with Two-Valued Aspects

A multivalued aspect in its simplest form is a two-valued aspect. When the aspect is the chromatic response to visible light, a rotatable element with a two-valued aspect can be referred to as a bichromal rotatable element. Such a rotatable element may be fabricated by the union of two layers of material as described in U.S. Pat. Nos. 5,262,098 and 6,147,791, herein incorporated by reference.

FIGS. 3–5 depict rotatable element 10 with a two-valued aspect and an exemplary system that use such rotatable elements from the prior art. In FIG. 3, rotatable element 10 is composed of first layer 70 and second layer 80 and is, by way of example again, a generally spherical body. The surface of first layer 70 has first coating 75 at a first Zeta potential, and the surface of second layer 80 has second coating 85 at a second Zeta potential. First coating 75 and second coating 85 are chosen such that, when in contact with a dielectric fluid (not shown), first coating 75 has a net negative electric charge with respect to second coating 85. This is depicted in FIG. 3 by the "−" and "+" symbols respectively. Furthermore, the combination of first coating 75 and the surface of first layer 70 is white-colored, and the combination of second coating 85 and the surface of second layer 80 is non-white-colored, indicated in FIG. 3 by hatching. One skilled in the art should appreciate that the material associated with first layer 70 and first coating 75 may be the same. Likewise, the material associated with second layer 80 and second coating 85 may be the same.

FIG. 4 depicts no-field set 110. No-field set 110 is a subset of randomly oriented rotatable elements in the vicinity of vector field 100 when vector field 100 has zero magnitude. Vector field 100 is an electric field. No-field set 110, thus, contains rotatable elements with arbitrary orientations with respect to each other. Therefore, observer 60 in the case of no-field set 110 registers views of the combination of second coating 85 and the surface of second layer 80, and first coating 75 and the surface of first layer 70 (as depicted in FIG. 3) in an unordered sequence. Infralayer 55 forms the backdrop of the resulting view. Infralayer 55 can consist of any type of material, including but not limited to other rotatable elements, or some material that presents a given aspect to observer 60.

FIGS. 5 and 6 depict first aspect set 120. First aspect set 120 is a subset of rotatable elements in the vicinity of vector field 100 when the magnitude of vector field 100 is nonzero and has the orientation indicated by arrow 105. In first aspect set 120, all of the rotatable elements orient themselves with respect to arrow 105 due to the electrostatic dipole present on each rotatable element 10. In contrast to no-field set 110, observer 60 in the case of first aspect set 120 registers a view of a set of rotatable elements ordered with the non-white-colored side up (the combination of second coating 85 and the surface of second layer 80 as depicted in FIG. 3). Again, infralayer 55 forms the backdrop of the resulting view. In FIGS. 5 and 6, rotatable element 10, under the influence of applied vector field 100, orients itself with respect to vector field 100 due to the electric charges present as a result of first coating 75 and second coating 85. FIG. 5 is a side view indicating the relative positions of observer 60, first aspect set 120, and infralayer 55. FIG. 6 is an alternate view of first aspect set 120 from a top perspective. In FIG. 6, the symbol ⊙ indicates an arrow directed out of the plane of the figure.

One skilled in the art should appreciate that first aspect set 120 will maintain its aspect after applied vector field 100 is removed, in part due to the energy associated with the attraction between rotatable element 10 and the substrate structure, as, for example, cavity walls (not shown). This energy contributes, in part, to the switching characteristics and the memory capability of rotating element sheet material 50, as disclosed in U.S. Pat. No. 4,126,854, hereinabove incorporated by reference, and discussed in more detail below.

Further still, one skilled in the art should appreciate that no-field set and first aspect set discussed above in FIGS. 4–6 can form the elements of a pixel, where vector field 100 can be manipulated on a pixel by pixel basis using an addressing scheme as discussed, for example, in U.S. Pat. No. 5,717,515, herein incorporated by reference.

For example, U.S. Pat. No. 4,126,854 entitled "Twisting Ball Panel Display" issued Nov. 21, 1978, and U.S. Pat. No. 4,143,103 entitled "Method Of Making A Twisting Ball Display," issued Mar. 6, 1979, both by Sheridon, describe a rotating element sheet material that comprises bichromal rotatable elements contained in fluid-filled cavities and embedded in an elastomer medium. One segment of the bichromal rotatable elements has a larger electrical charge in contact with the fluid and in the presence of the electrical field than the other segment. Thus, for a given polarity of applied electrical field, one segment will rotate toward and be visible to an observer of the display. Applying the opposite polarity of electrical field will cause the rotatable element to rotate and present the other segment to be seen by the observer.

U.S. Pat. No. 4,143,103 describes the response of the bichromal rotatable element to the applied electrical field as a threshold response. That is, as the external field is increased, the bichromal rotatable element remains stationary in position until a threshold voltage is reached, at which time the rotatable element starts to rotate from its initial position. The amount of rotation increases with an increasing electrical field until a 180-degree rotation can be achieved. The value of the external field that causes a 180-degree rotation is called the full addressing voltage.

The response pattern of the bichromal rotatable element to an external electrical field determines the type of addressing that may be used to create images on the rotating element sheet material. There are known in the art three types of addressing schemes for displays. The first of these is active matrix addressing, which places the least demands on the properties of the display.

In active matrix addressing a separate addressing electrode is provided for each pixel of the display and each of these electrodes is continuously supplied with an addressing voltage. The complete set of voltages can be changed for each addressing frame. While this type of addressing places the least demands on the properties of the display medium, active matrix addressing is the most expensive, most complicated and least energy efficient type of addressing.

The second type of addressing scheme is passive matrix addressing. Passive matrix addressing makes use of two sets of electrodes, one on each side of the display medium. Typically, one of these consists of horizontal conductive lines and the other consists of vertical conductive lines. The conductive lines on the front surface or window of the display are necessarily aspect-transparent. To address the display medium a voltage is placed on a horizontal conductive line and a voltage is placed on a vertical conductive line. The segment of medium located at the intersection of these two lines experiences a voltage equal to the sum of these two voltages. If the voltages are equal, as they usually are, the sections of medium located adjacent to the each of the lines, but not at the intersection of the lines, experience ½ the voltage experienced by the section of medium at the line intersection. Passive addressing is less complicated and more energy efficient because the pixels of the display medium are addressed only for as long as is required to change their optical states. However, the requirements for a medium that can be addressed with a passive matrix display are significantly greater than for the active matrix case. The medium must respond fully to the full addressing voltage but it must not respond to ½ the full addressing voltage. This is called a threshold response behavior. The medium must also stay in whichever optical state it has been switched into by the addressing electrodes without the continuous application of voltage—that is, it should store the image without power. Passive addressing is the most widely used method of addressing displays and is the lowest cost.

The third type of addressing consists of a linear array of addressing electrodes in the form of a bar that can be moved over the surface of the sheet material. In this form of addressing, the sheet material is placed over or incorporates a grounding electrode and is protected from possible mechanical damage from the moving bar by placing a thin window between the bar and the rotating element sheet material. As the bar is moved over the sheet material, it applies voltages to specific pixels of the sheet material for short periods of time and generates a full image each time the bar is scanned over the surface. In one variation of this method, the addressing bar deposits image-wise charge on the surface of the window.

The requirements imposed on the sheet material by this form of addressing then depend on which type of addressing bar is used. If the addressing bar simply exposes the sheet material to voltages as it passes over the surface, then it is necessary for the rotating sheet material to exhibit threshold behavior. Thus the area of the sheet material directly under the addressing bar electrode must undergo a change in aspect when exposed to the full addressing voltage; but as the bar moves to the next row of pixels, this same area of sheet material must not respond to the diminished voltages experienced by the sheet material from the moving addressing bar. As in passive addressing, this requires that the sheet material have a sharp threshold response. This addressing bar also requires that the change in aspect occur completely during the time the addressing bar electrodes move over its vicinity, which usually limits the display frame addressing speed. U.S. patent application Ser. No. 09/037,767 by Howard et al. entitled "Charge Retention Islands For Electric Paper And Applications Thereof" and also assigned to the same assignee as this application, describes an arrangement of addressing electrodes that greatly reduces the switching speed requirements of the medium due to this effect.

In U.S. patent application Ser. No. 09/037,767 the addressing bar deposits image-wise charge on or near the surface of the sheet material. The charge deposition addressing method relaxes the requirements on the sheet material. The addressing bar speed over the surface is limited only by the rate at which it can deposit image-wise charge, because the sheet material can respond to the voltage associated with the deposited charge pattern at its own speed. Threshold response behavior is not so important; however, the ability to store the image is because it can be expected that the image-wise charge deposited on the sheet material will leak off over a short period of time. However, addressing bars that can deposit image-wise charge on or near the sheet material tend to be bulky and more expensive than bars that simply impose image-wise voltages directly.

II.B. Fringe Fields Associated with Addressable Displays

FIGS. 7–10 depict an exemplary kit of the prior art for addressing an addressable display. In FIGS. 7–10, the exemplary addressable display is rotating element sheet material; however, one skilled in the art should appreciate that a number of addressable displays will exhibit similar effects to those disclosed, such as displays relying in general on electrophoresis. FIG. 7 depicts infralayer 260 as an exemplary grounding sheet. One skilled in the art should appreciate that although infralayer 260 is depicted as grounded in FIGS. 7 and 8, it is sufficient for infralayer 260 to simply be at a different potential from stylus 200. This is depicted in FIGS. 7 and 8 by illustrating stylus 200 connected to voltage source 240, which is connected to ground. The potential difference between stylus 200 and infralayer 260 in FIGS. 7 and 8, with a suitable choice of material in the distal end of stylus 200, can result in the production of a vector field in the region between the distal end of stylus 200 and infralayer 260. This is depicted in FIGS. 7 and 8 by dashed lines existing in space between stylus 200 and infralayer 260. FIGS. 7 and 8 also depict stylus 200 moving in the direction of arrow 250. Accordingly, there will be two regions of fringe fields associated with the vector field between stylus 200 and infralayer 260. These are indicated as leading fringe field 275 and trailing fringe field 285.

As described earlier, rotatable elements 10 in the path of stylus 200 will tend to orient themselves in response to the vector field introduced between stylus 200 and infralayer 260. In FIG. 7, this is illustrated by indicating the rotatable elements to the right of stylus 200 in an orientation with the white-colored side towards observer 60, and the rotatable elements under stylus 200 and in the influence of the vector field oriented with their non-white-colored side towards stylus 200.

One skilled in the art should appreciate that the work function necessary to change the orientation and position of rotatable elements from a fixed position and orientation is greater than the work function necessary to change the orientation and position of rotatable elements that are already in motion. Such an effect is the result of a variety of factors, including such processes as conventionally understood as producing the difference between static friction and kinetic friction, and also as a result of fluid dynamics associated with the motion of the enabling fluid (not shown) in response to the motion of rotatable element. Similarly, one skilled in the art should appreciate that conventional displays relying on electrophoretic effects will exhibit a similar effect. Accordingly, the response of rotatable elements to leading fringe field 275 is different from the response of rotatable elements to trailing fringe field 285. Specifically, while the rotatable elements immediately beneath stylus 200 in FIGS. 7 and 8 will tend to orient themselves such that the non-white-colored side is toward observer 60, such motion will have a tendency to free the rotatable elements for further motion under the influence of a weaker field until they ultimately come to rest to a stable position and orientation. Accordingly, and as depicted in FIG. 8, the non-white-colored sides of the rotatable elements continue to orient themselves under the influence of trailing fringe field 285. From the perspective of oberver 60, the aspect produced by the rotatable elements will be that of approximately 50% white-colored aspect and 50% non-white-colored aspect. This is depicted in FIG. 9 from a top perspective.

Accordingly, and from a macroscopic perspective, rather than producing a line with a saturated aspect, stylus 200 used to address rotating element sheet material 50 will produce unsaturated line 290. Such a macroscopic perspective is depicted in FIG. 10. Although the effect disclosed herein relates to a saturated aspect when addressing rotating element sheet material, in general, displays relying on electrophoretic effects may also exhibit undersirable aspects as a result of fringe fields.

II.C. Work Function

As discussed above, a useful property of rotating element sheet material is the ability to maintain a given aspect after applied vector field 100 for addressing is removed. This ability contributes, in part, to the switching characteristics and the memory capability of rotating element sheet material 50, as disclosed in U.S. Pat. No. 4,126,854, hereinabove incorporated by reference. This will be referred to as aspect stability. The mechanism for aspect stability in the above embodiments is generally the energy associated with the attraction between the rotatable elements and the containment structure, or "work function." A host of factors influence the magnitude of the energy associated with the work function including, but not limited to: surface tension of enabling fluid in contact with rotatable elements; the relative specific gravity of the rotatable elements to the enabling fluid; magnitude of charge on rotatable elements in contact with containment structure; relative electronic permittivity of enabling fluid and containment structure; "stickiness" of containment structure; and other residual fields that may be present. The applied vector field for addressing must be strong enough to overcome the work function in order to cause an orientation change; furthermore, the work function must be strong enough to maintain this aspect in the absence of an applied vector field for addressing.

FIG. 11 depicts an exemplary diagram of number 180, N, of rotatable elements that change orientation as a function of applied vector field 102, V of the prior art. The work function 184, $V_W$, corresponds to the value of applied vector field 102 when the number 180 of rotatable elements that change orientation has reached the saturation level 186, $N_S$, corresponding to the orientation change of all rotatable elements 10.

II.D. Rotatable Elements with Magnetic Latching

One method for fabricating rotating element sheet material that produces a saturated aspect when addressed with a stylus has been disclosed in U.S. Pat. No. 6,147,791 entitled "Gyricon displays utilizing rotating elements and magnetic latching," herein incorporated by reference. A rotatable element consistent with the invention disclosed in U.S. Pat. No. 6,147,791 is depicted in FIG. 12. The rotatable element of FIG. 12 is a multiaspect rotatable element and may be generally fabricated as disclosed in U.S. Pat. No. 5,894,367, hereinabove incorporated by reference. Rotatable element 10 in FIG. 12 is composed of core 140 within aspect-transparent cladding 137. Core 140 in FIG. 12 is prism-shaped and is depicted as a square column. As used herein, the term "prism-shaped" refers to a polyhedron whose ends have substantially the same size and shape and are substantially parallel, and whose remaining sides are each substantially parallelograms. Depending upon the orientation of rotatable element 10 about an axis of rotation through core 140, rotatable element 10 may present first aspect surface 142, second aspect surface 144, third aspect surface, or fourth aspect surface to a favorably situated observer. In FIG. 12, first aspect surface 142 and second aspect surface 144 are depicted from a view of one hemisphere of rotatable element 10. As described earlier, in order to address rotatable element 10, the surface of aspect-transparent cladding 137 above first aspect surface 142 has first coating 130 at a first Zeta potential, and the surface of aspect-transparent cladding 137 above third aspect surface has second coating 135 at a second Zeta potential such that first coating 130 has a net negative charge, "−," with respect to second coating 135 when rotatable element 10 is in contact with a dielectric fluid (not shown).

In order to produce a saturated aspect, however, the rotatable element of FIGS. 12 and 13 also comprise rotatable latching components 170, preferably located at the apex between aspect surfaces. FIGS. 12 and 13 depict a rotatable element with four aspects and four element latching components 170. Latching components 170 preferably extend along the entire axis of rotatable element 10. The rotatable latching components 170 contained within the rotatable elements comprise hard magnetic material, as disclosed in U.S. Pat. No. 6,147,791, hereinabove incorporated by reference. "Hard" magnetic materials are materials that exhibit some residual magnetism in the absence of an external field, such as ferromagnetic material. Rotating element sheet material that promotes a saturated aspect and incorporates the rotatable element of FIG. 12 is depicted in FIG. 13. FIG. 13 depicts rotating element sheet material 50 containing rotatable element 10 of FIG. 12 and includes sheet latching components 172. Sheet latching components 172 preferably comprise soft magnetic material, or material that does not exhibit a significant amount of magnetization in the absence of an external field such as paramagnetic material or superparamagnetic material. As depicted in FIG. 13, the magnetic field that is present between element latching components 170 and sheet matching components 172 will induce a torque about the axis of rotation of the rotatable element for any orientation other than the one that minimizes the distance between element latching component 170 and sheet latching component 172.

One skilled in the art should also appreciate that the element latching components 170 and the sheet latching components 172 will contribute to the "work function" energy associated with the attraction between rotatable element 10 and the substrate structure, as, for example, cavity walls (not shown), and that contributed to aspect stability. Again, this energy will contribute, in part, to the switching characteristics and the memory capability of rotating element sheet material 50, as disclosed in U.S. Pat. No.

4,126,854, hereinabove incorporated by reference. Such a system will help to produce a saturated aspect exhibited to observer 60, but requires detailed manufacturing procedures.

Accordingly, it is desirable to fabricate rotating element sheet material that will exhibit a saturated aspect but will not require detailed manufacturing procedures, such as the introduction of rotatable latching components and sheet latching components. Furthermore, it is generally desirable to decrease the effect of fringe fields in addressable displays.

III. SUMMARY OF INVENTION

In a first embodiment, a display kit of the present invention comprises: an addressable display medium configured to exhibit a first aspect under the influence of an addressing vector field in a first direction at an addressing magnitude; and an addressor; where the addressor is configured to provide the addressing vector field in the first direction at the addressing magnitude to a portion of the display medium; and a filter comprising: a first sheet electrode and a second sheet electrode configured to exhibit a first vector field in the first direction at a first magnitude to the portion of the display medium; where the first magnitude is less than the addressing magnitude; where the display medium is located between the first sheet electrode and the second sheet electrode; and where the first sheet electrode is between the addressor and the display medium.

In a first embodiment of a method for addressing a display medium, the method comprises the steps of: providing the display kit described above where the first sheet electrode has a restivity equal to R ohms per square and a capacitance per unit area equal to C; where the distal end of the stylus has a width w; and moving the stylus with a speed substantially equal to $1/(wRC)$ such that the first sheet electrode is between the stylus and the substrate.

IV. BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings, FIG. 1 depicts rotating element sheet material of the prior art;

V. DETAILED DESCRIPTION

Figure 1:
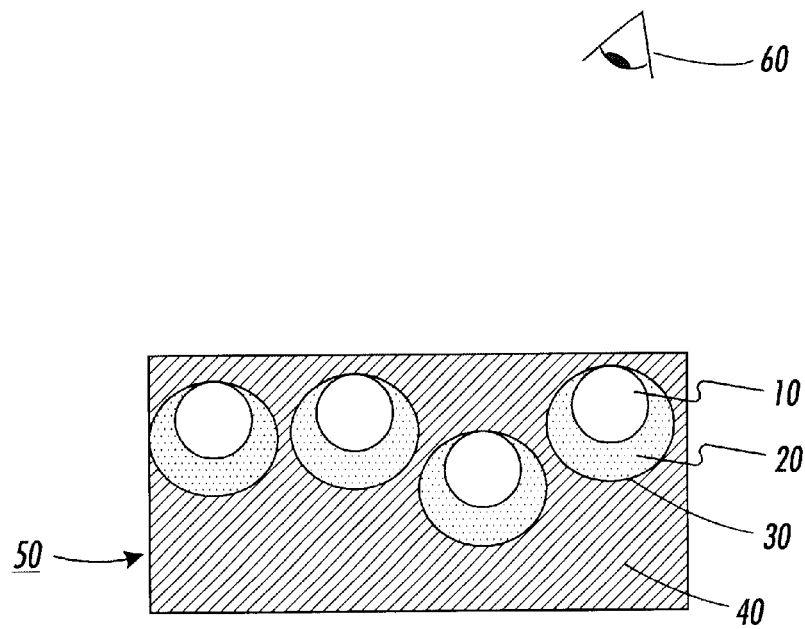
Figure 2:
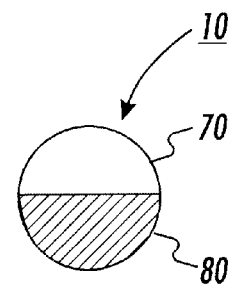
FIG. 2 depicts a cross section of a rotatable element of the prior art.
Figure 3:
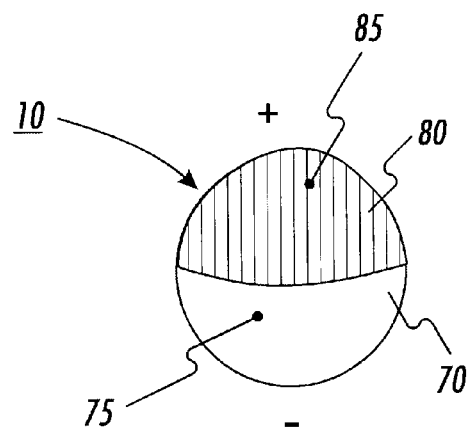
FIG. 3 depicts a rotatable element of the prior art with the addressing polarity when in contact with a dielectric fluid and under the influence of an addressing field.
Figure 4:
FIG. 4 depicts a set of rotatable elements of the prior art in the presence of an addressing vector field with zero amplitude.
Figure 5:
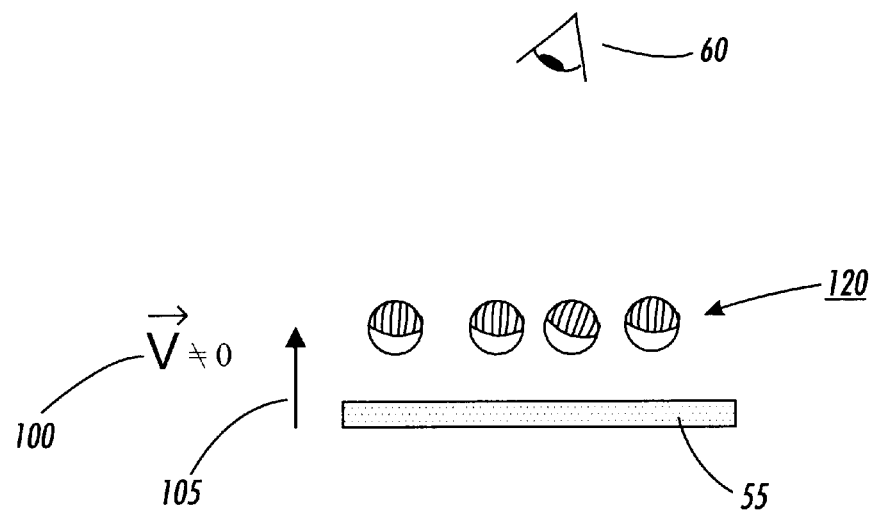
FIG. 5 depicts a set of rotatable elements of the prior art in the presence of an addressing vector field with nonzero magnitude.
Figure 6:
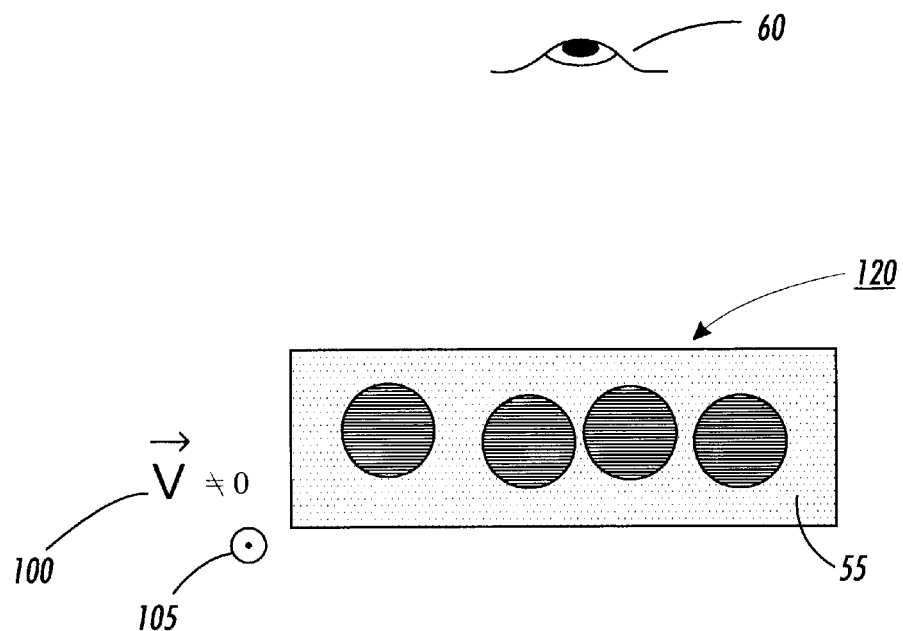
FIG. 6 depicts an alternate view of the set of rotatable elements of FIG. 5.
Figure 7:
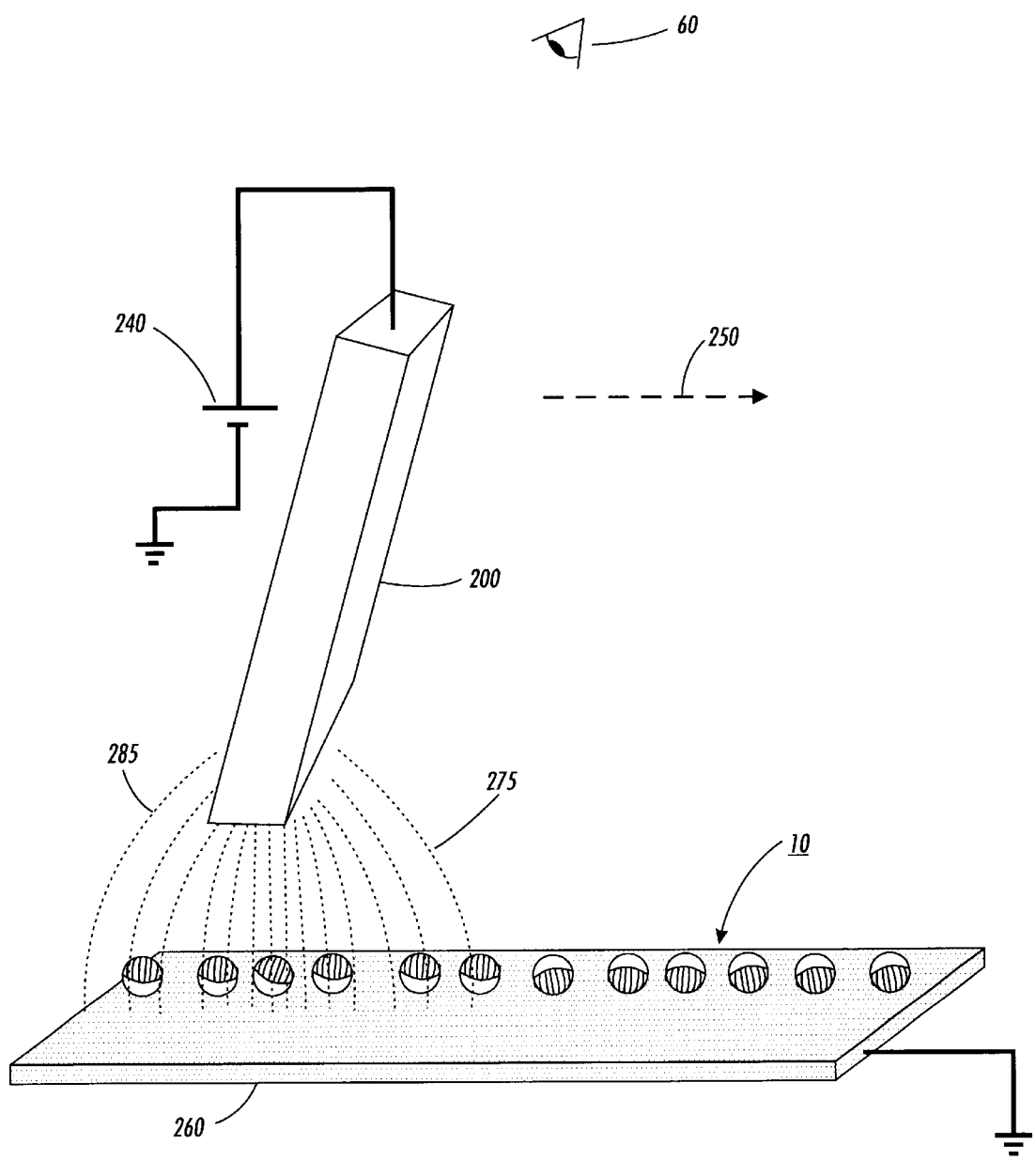
FIG. 7 depicts a stylus for addressing rotating element sheet material of the prior art.
Figure 8:
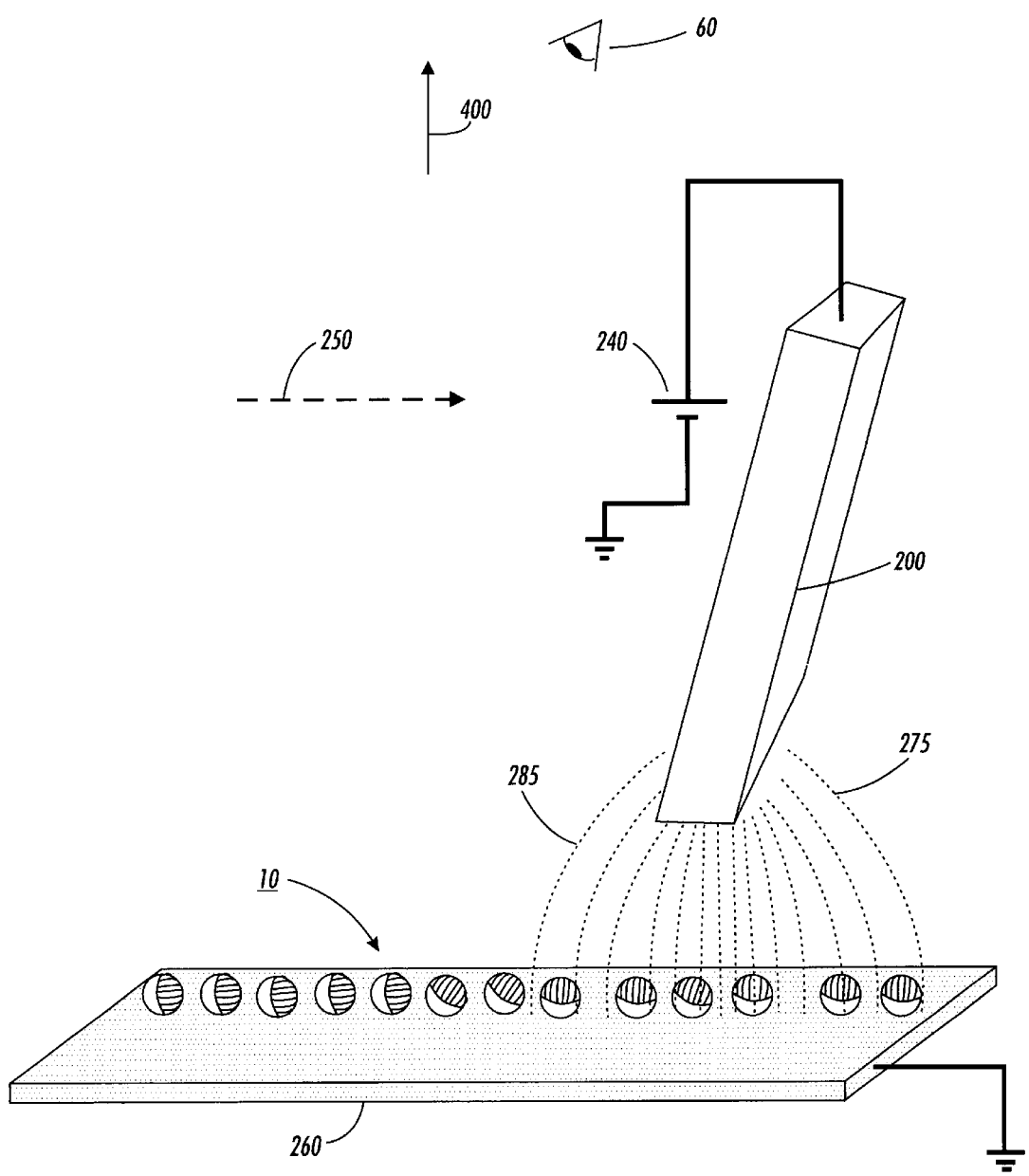
FIG. 8 depicts the effect of the trailing fringe field from FIG. 7.
Figure 9:
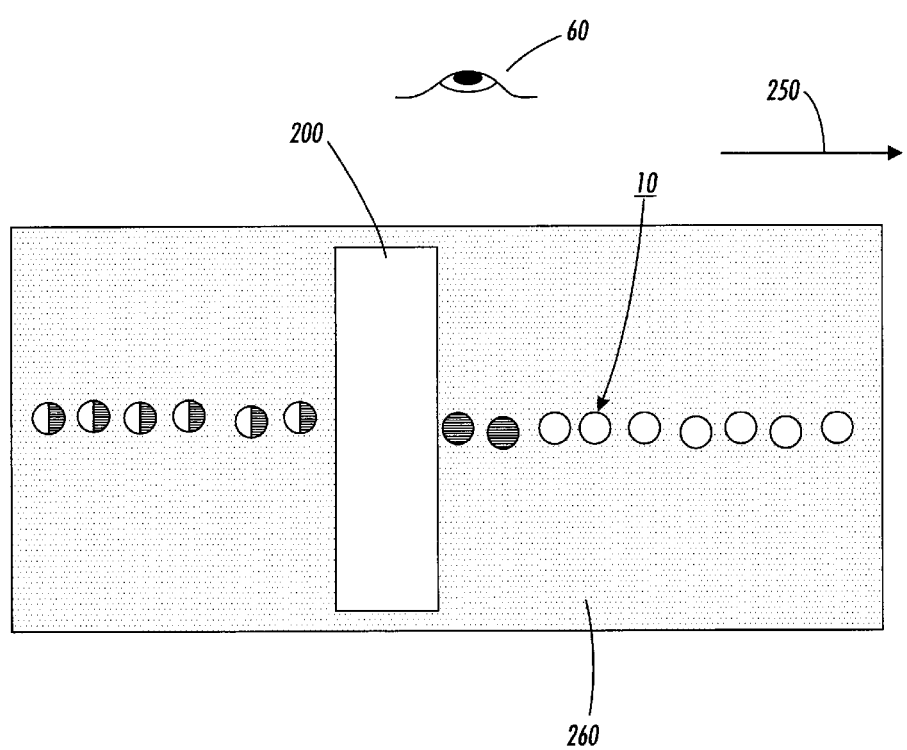
FIG. 9 depicts a view of the kit of FIG. 8 from a top perspective.
Figure 10:
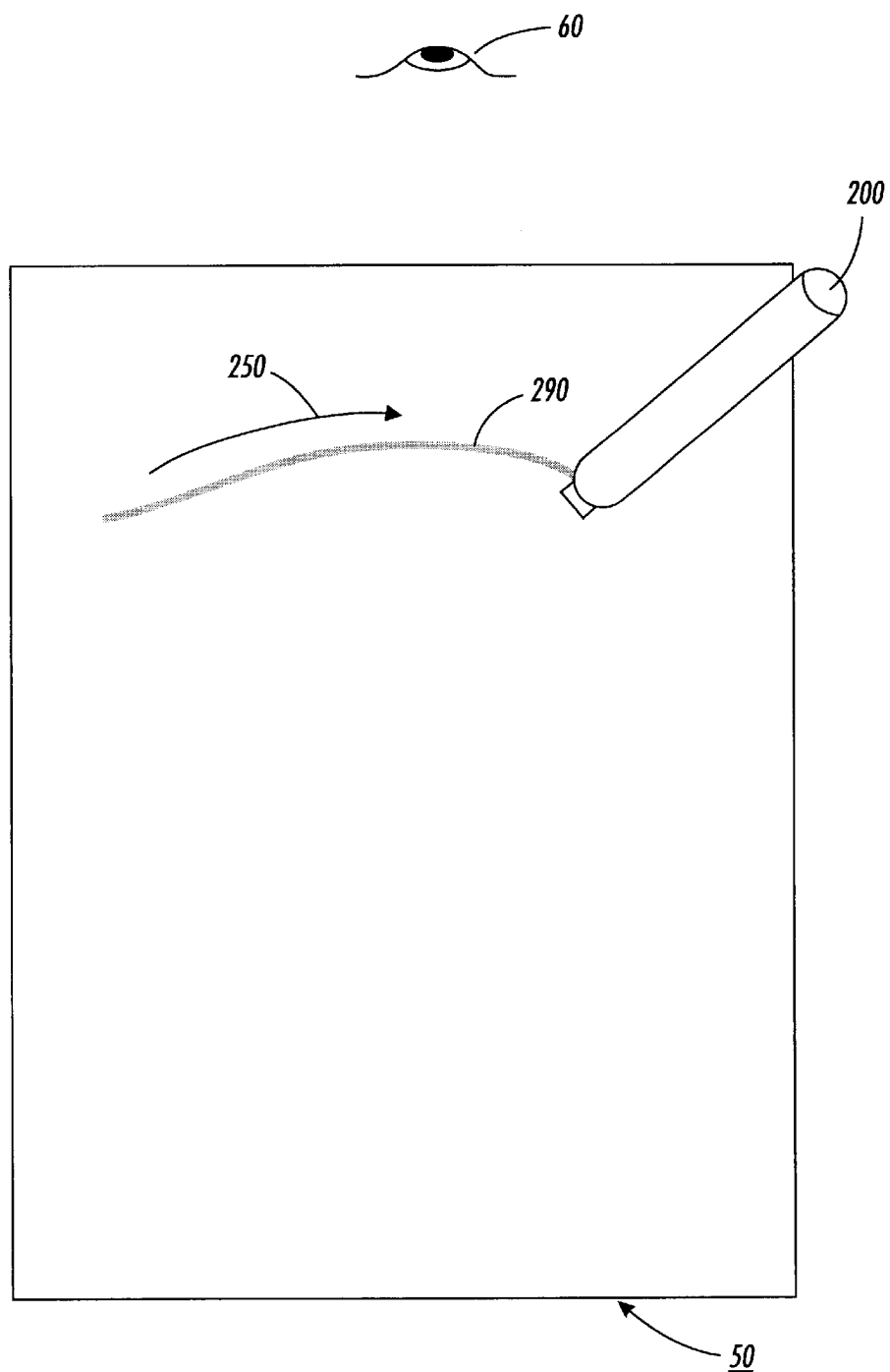
FIG. 10 depicts a macroscopic view of the effect of the trailing fringe field of FIGS. 8 and 9.
Figure 11:
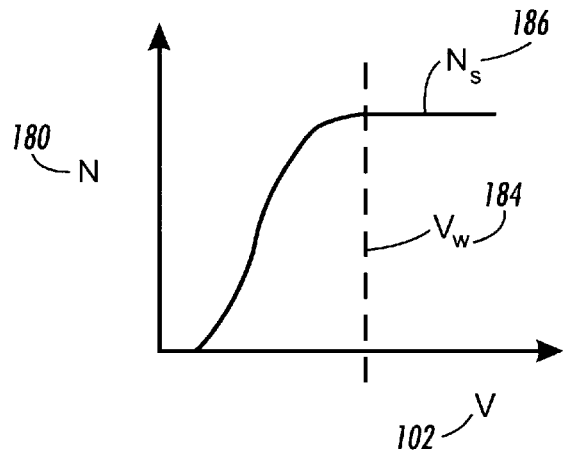
FIG. 11 is an exemplary graph of the number of rotatable elements that undergo a change in orientation as a function of applied vector field.
Figure 12:
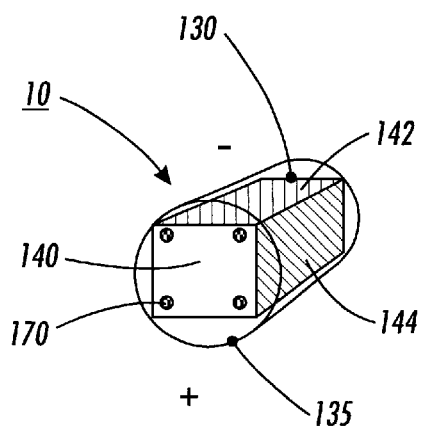
FIG. 12 depicts a rotatable element of the prior art with mutlivalued aspect and with latching components.
Figure 13:
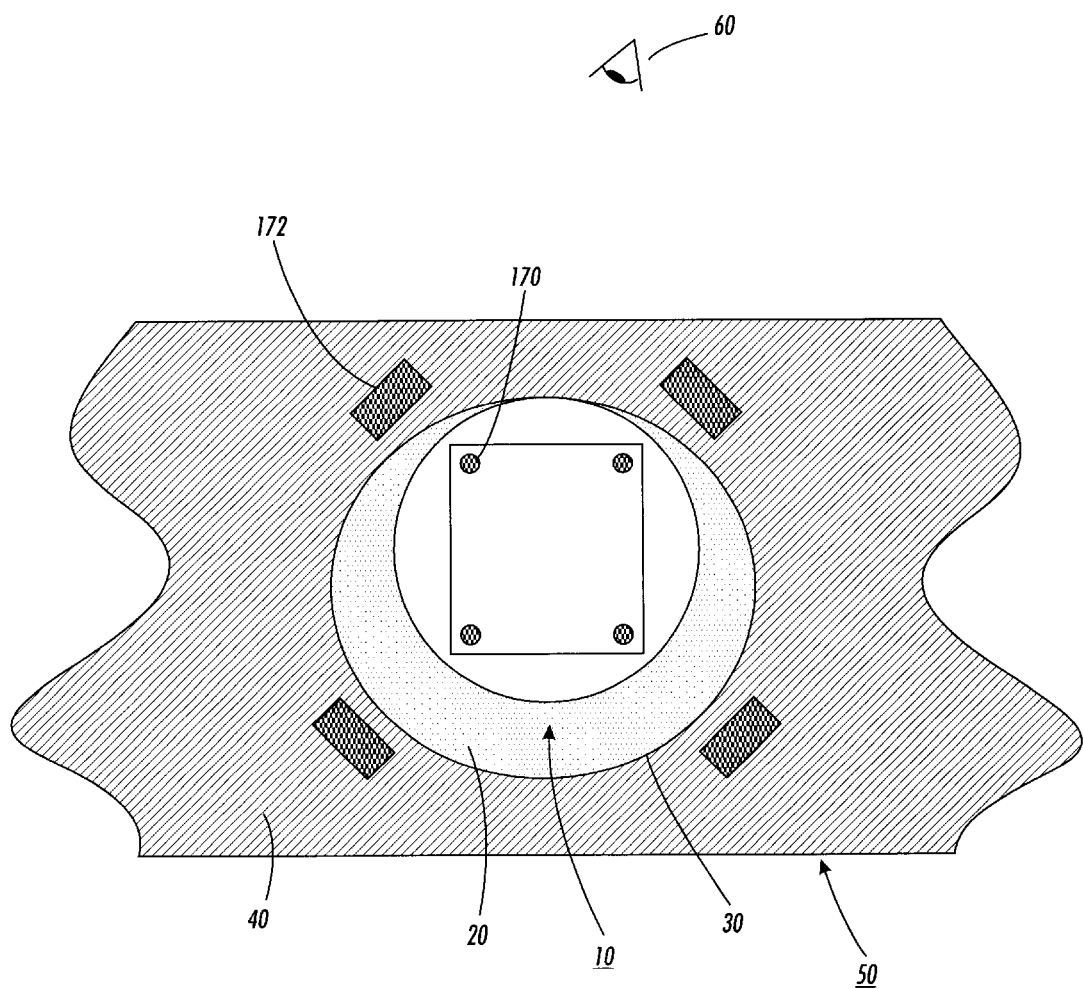
FIG. 13 depicts rotating element sheet material including the rotatable element of FIG. 12 and including sheet latching components.

Reference will now be made in detail to an implementation consistent with the present invention as illustrated in the accompanying drawings. Whenever possible, the same reference number will be used throughout the drawings and the following description to refer to the same or like parts.

V.A. Definitions

As used herein, "aspect" refers to a common response to incident electromagnetic energy of interest. For example, if the incident electromagnetic energy of interest lies in the visible spectrum, then a first aspect may correspond to a black appearance, and a second aspect may correspond to a white appearance. If the incident electromagnetic energy of interest lies in the x-ray region, then a first aspect may correspond to the transmission of the x-ray energy, while a second aspect may correspond to the absorption of the x-ray energy. Furthermore, the "common response" may comprise any of the phenomena of absorption, reflection, polarization, transmission, fluorescence, or any combination thereof.

As used herein, "observer" refers to a human perceiver, or to a human perceiver in conjunction with an apparatus sensitive to the electromagnetic energy of interest. If the electromagnetic energy of interest lies in the visible spectrum, then observer may refer to a human perceiver. If the electromagnetic energy of interest lies outside of the visible spectrum, then observer refers to an apparatus sensitive to the electromagnetic energy and capable of resolving the aspects of interest into human perceivable form.

As used herein, "diameter" refers to an order of magnitude dimension corresponding to any of height, width, and depth of any microencapsulation structure or aspect elements. The use of "diameter" does not imply that circular, spherical, or cylindrical geometry only is under consideration.

As used herein, "vector field" refers to a field whose amplitude in space is capable of having a magnitude and a direction. Vector fields of interest in the present invention include electric fields, magnetic fields, or electromagnetic fields.

As used herein, "work function" refers to the amount of energy necessary to overcome the attraction between an aspect element and the microencapsulation structure so as to enable displacement. As mentioned above, a host of factors influence the magnitude of the energy associated with the work function including, but not limited to: surface tension of first aspect medium in contact with second aspect element; the relative specific gravity of first aspect medium to second aspect element; magnitude of charge on second aspect element; relative electronic permittivity of first aspect medium and microencapsulation structure; "stickiness" of microencapsulation structure; and other residual fields that may be present.

As used herein, the term "prism-shaped" refers to a polyhedron whose ends have substantially the same size and shape and are substantially parallel, and whose remaining sides are each substantially parallelograms.

As used herein, the term "display medium" refers to any material that exhibits at least two distinct aspects under the influence of an external vector field, where the aspect exhibited is a function of the magntiude and direction of the external vector field.

As used herein, the terms "addressor" and "grounding sheet" refer to an apparatus configured to provide a vector field with a magnitude and direction at a portion of a region next to the grounding sheet.

V.B. Rotating Element Sheet Material Consistent with the Present Invention

A display medium consistent with the present invention is depicted in FIGS. 14–17. In particular, rotating element sheet material 400 is depicted. One skilled in the art should appreciate that the fringe-field filtering effects described herein are not limited rotating element sheet material 400. Indeed, the fringe-field filtering effects described herein may be used with any electro-sensitive or electro-optical sheet materials addressed by a stylus or stylus array. Thus, a sheet material that comprises electrophoretic particles dispersed in colored liquid, as described by Ota and others, as in I. Ota,et al., IEEE Conference on Display Devices, 72 CH 0707-0-ED 1972, p. 46, or microencapsulated electrophoretic particles dispersed in colored liquid as described by Comiskey et al. (1997) in "Electrophoretic Ink: A printable Display Material," SID 97 Digest, 75–76, will also benefit in the same manner as a sheet material that comprises rotatable elements. Likewise these benefits will accrue to liquid crystal sheet materials.

Figure 14:
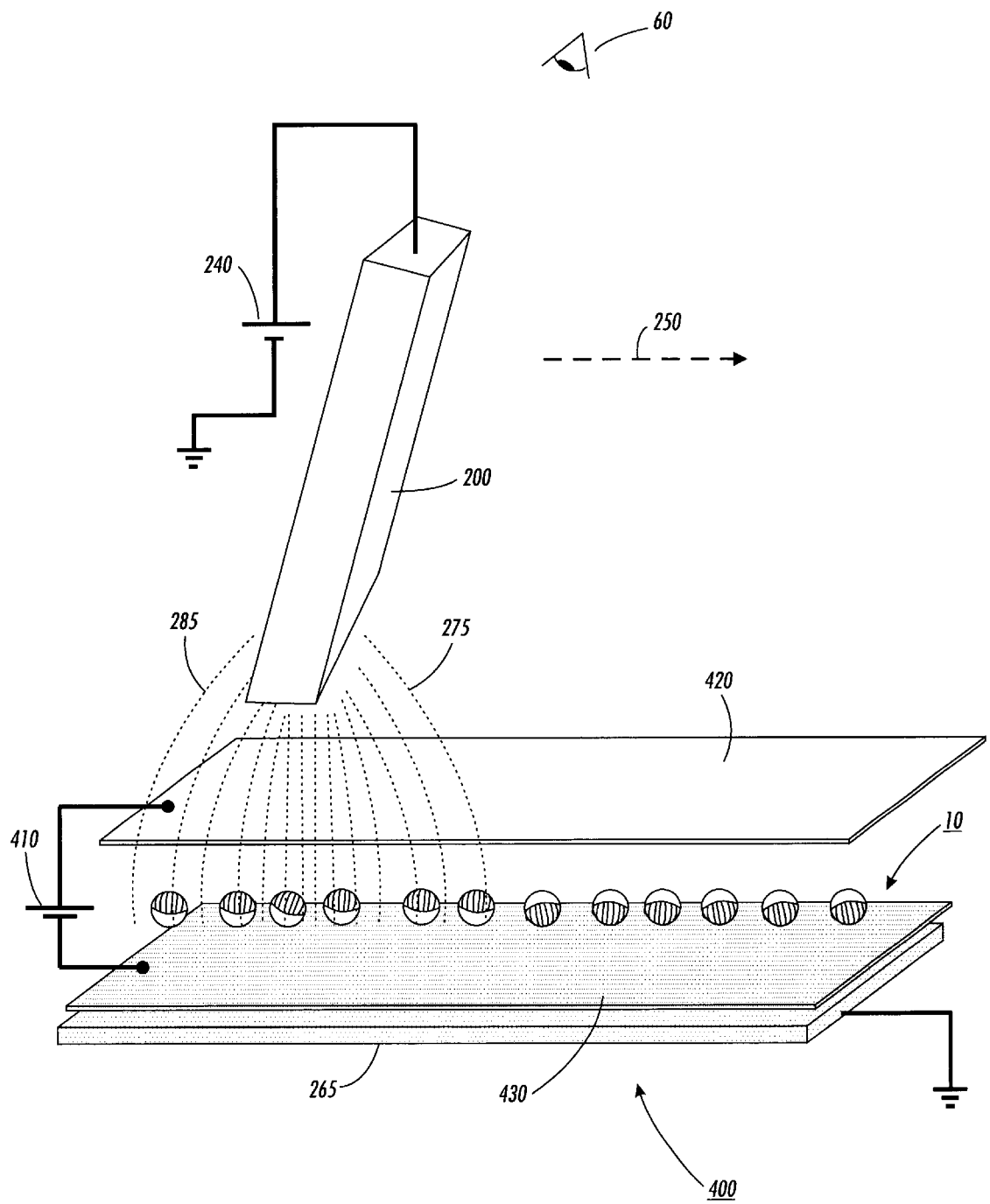
FIG. 14 depicts rotating element sheet material of the present invention in the presence of a stylus for addressing.
Figure 15:
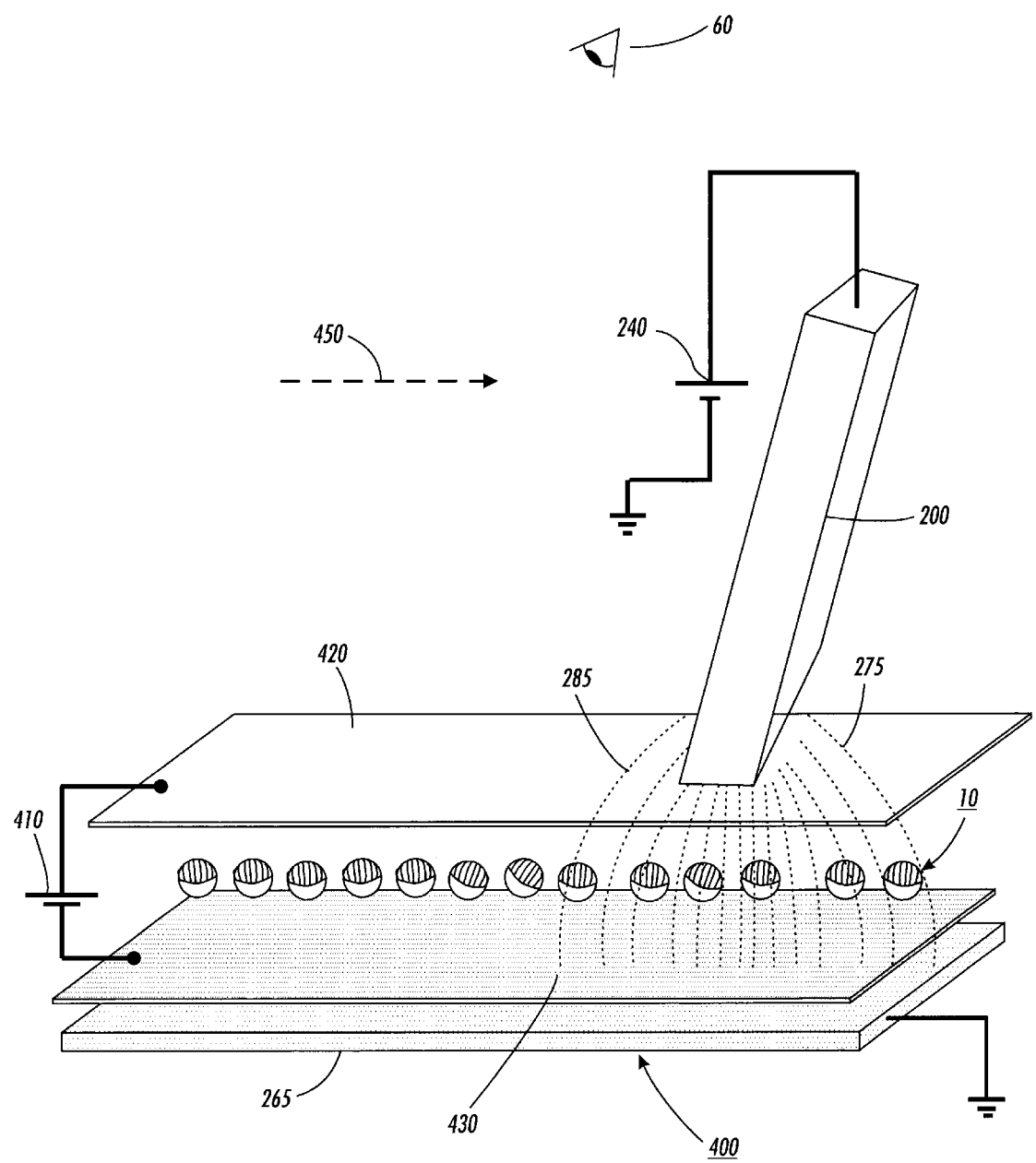
FIG. 15 depicts the saturated aspect that is produced by rotating element sheet material of the present invention.
Figure 16:
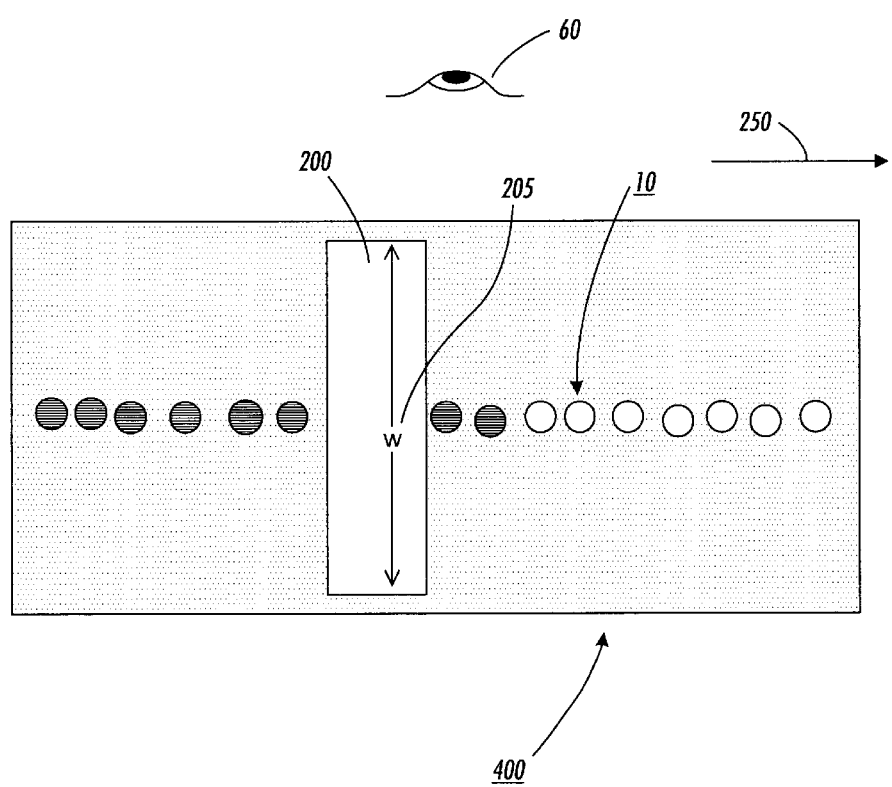
FIG. 16 depicts a view of the kit of FIG. 15 from a top perspective.

FIG. 14 depicts rotating element sheet material 400 with a plurality of rotatable elements 10 dispersed in a substrate (not shown) and in contact with an enabling fluid (also not shown). Furthermore, rotating element sheet material 400 comprises grounding sheet 265 held at a vector field potential magnitude that is different from that of the distal end of stylus 200. This is illustrated in FIGS. 14 and 15 by depicting grounding sheet 265 as connected to ground, and stylus 200 connected to voltage source 240, which is also grounded.

Furthermore, as before, stylus 200 moving in the direction of arrow 250 and proximal to rotating element sheet material 400 will have an associated leading fringe field 275 and trailing fringe field 285.

In a preferred embodiment, a filter consistent with the present invention comprises first sheet electrode 420 and second sheet electrode 430. First sheet electrode 420 and second sheet electrode 430 are configured to exhibit a first vector field between them. This is illustrated in FIGS. 14 and 15 by depicting a voltage source between the two sheets. The magnitude of the field between first sheet electrode 420 and second sheet electrode 430 is at a first magnitude such that the energy coupling between the first vector field and the addressing dipole of the rotatable element is less than the work function associated with changing the position and orientation of rotatable element. Accordingly, the presence of first sheet electrode 420 and second sheet electrode 430 will not alter a static aspect that is viewed in the absence of first sheet electrode and second sheet electrode. Again, one skilled in the art should appreciate that this may also be applied to any addressable display medium, such as those based on electrophoretic effects.

One skilled in the art should appreciate that a perfect conductor placed between stylus 200 and rotatable element 10, where rotatable element 10 is between stylus 200 and grounding sheet 265, will shield rotatable element 10 from the influence of the vector field produced between stylus 200 and grounding sheet 265. Accordingly, if first sheet electrode 420 were a perfect conductor, then stylus 200, at rest, would have no influence on the display medium, such as the rotating element sheet material of FIG. 14.

However, one skilled in the art should further appreciate that if first sheet electrode is not a perfect conductor, then it is possible for the vector field produced between stylus 200 and grounding sheet 265 to have an influence on the display medium. Specifically, if first sheet electrode has a resistivity equal to R ohms per square, a capacitance equal to C farads per unit area, and stylus 200 has width w (FIG. 16) and moves at speed substantially equal to v=1/(RCw), then the free charges within first sheet electrode will not have sufficient time to arrange themselves so as to completely shield rotatable elements 10 from the field produced by the vector field between stylus 200 and grounding sheet 265. Accordingly, a portion of the vector field between stylus 200 and grounding sheet 265 will penetrate first sheet electrode 420 and influence the orientation and position of rotatable elements 10. One skilled in the art may understand the portion that penetrates to the display medium to be leading edge 275, as well as a portion of the vector field directly beneath stylus 200.

Figure 17:
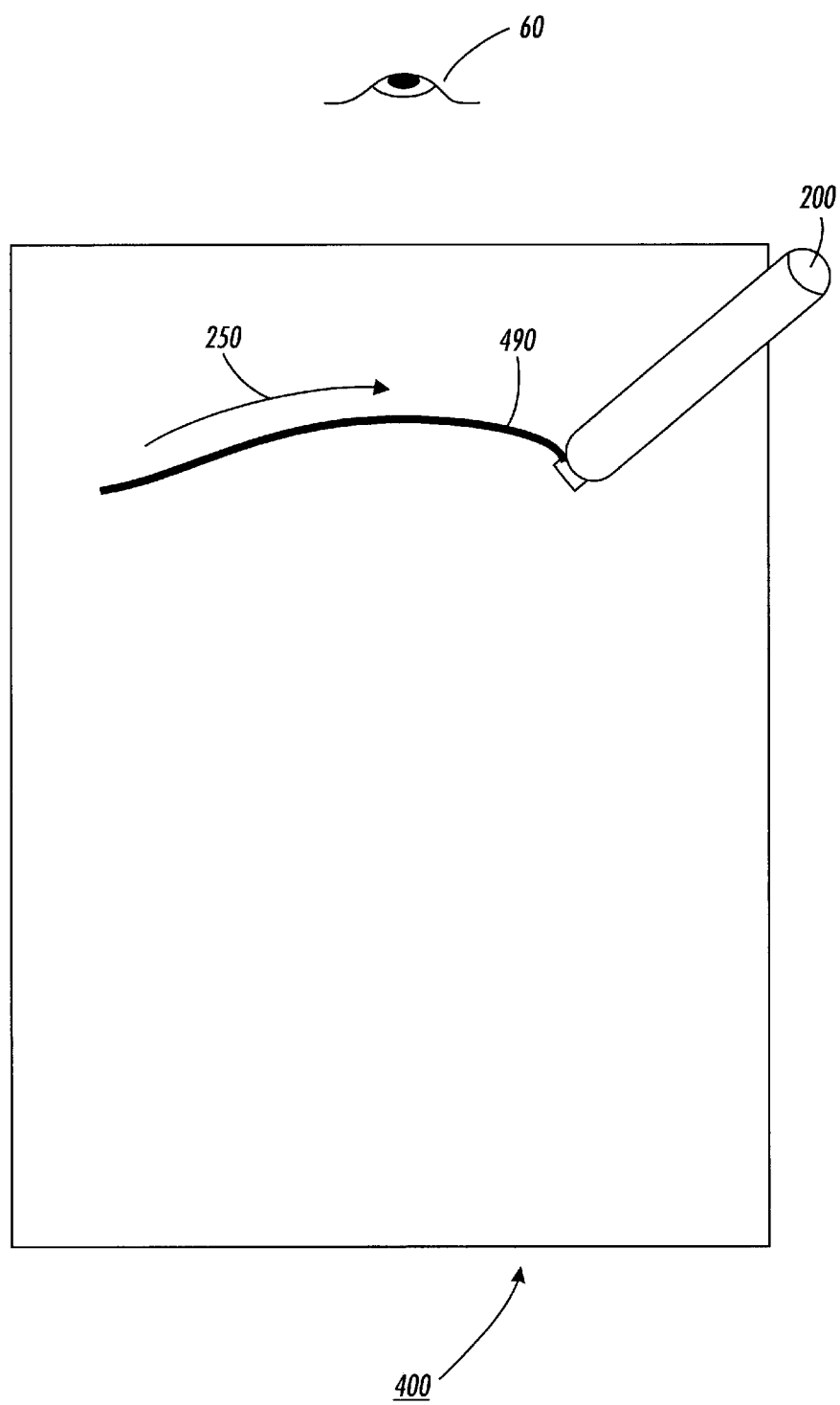
FIG. 17 depicts a macroscopic view of the saturated aspect produced by the rotating element aheet material of the present invention.

Further still, one skilled in the art should appreciate that there will be a portion of the field that is shielded, due to the spread-out nature of the vector field between stylus 200 and grounding sheet 265. Specifically, trailing fringe field 285 will be shielded by first sheet electrode 420. Accordingly, the plurality of rotatable elements in the path of stylus 200 will experience a sharp cutoff in the vector field that is introduced as stylus 200 moves past. It is this sharp cutoff that will prevent the plurality of rotatable elements from continuing to orient themselves according to the fringe field of stylus 200. As a result, the rotatable elements, addressed in this manner, will produce a saturated aspect in the direction of observer 60. A macroscopic perspective of the saturated aspect 490 is depicted in FIG. 17.

One skilled in the art may also understand the result produced by rotating element sheet material 400 by understanding that the selection of the magnitude of first vector field between first sheet electrode 420 and second sheet electrode 430. As stated earlier, the magnitude of first vector field is selected such that the energy coupling between the first vector field and the addressing dipole of the rotatable element is less than the work function associated with changing the position and orientation of rotatable element. However, after stylus 200 has introduced energy sufficient to change the position and orientation of rotatable element 10 from a static position and orientation, the energy coupling between the first vector field and the addressing dipole of the rotatable element will be sufficient to influence the orientation of rotatable element 10 until rotatable element 10 comes to rest again. Accordingly, rotating element sheet material 400 will produce a saturated aspect when addressed by stylus 200.

Second sheet electrode 430 is preferably a good conductor. Accordingly, one skilled in the art will appreciate that grounding sheet 265 is not necessary, as second sheet electrode 430 would then shield grounding sheet 265 from any fields originating above second sheet electrode 265. Furthermore, second sheet electrode 430 may be a non-conductor if grounding sheet 265 is located adjacent to it. Accordingly, the presence of grounding sheet 265 represents the most general case. Further still, one skilled in the art should appreciate that the filter will still function if grounding sheet 265 is absent and second sheet electrode 430 has a resistivity approximately equal to that of first sheet electrode 420.

One skilled in the art should appreciate that the resistivity of first sheet electrode 420 will be of the order of $10^{13}$ ohms/square, where stylus 200 is approximately 1 mm wide with a speed of 10 cm/sec, and where the capacitance of the display medium is approximately 5 picofarads/(cm$^2$) (exemplary capacitance of rotating element sheet material). Accordingly, first sheet electrode 420 preferably comprises Indium Tin Oxide sputtered on glass or plastic. Further still, there are a number of other choices for a high resistivity coating of conductive layers on glass and plastic. Preferably, such a coating comprises platinum, gold, or their alloys, since these materials have the property that they provide conductive coatings in all thicknesses of deposited material. In contrast, many other materials, such as aluminum, provide conductive layers only after a certain thickness is reached and after that the conductivity increases very rapidly with the deposition of further material, making it difficult to obtain uniform conductivity. In particular, even very thin layers of platinum, gold, or platinum-alloys and gold-alloys on glass or plastic are conductive and the conductivity increases uniformly with increased thickness of deposited material. Further still, such materials are also transparent at thicknesses of 100 Angstroms, which is a preferably thickness. However, one skilled in the art should appreciate that there may be a range of thicknesses consistent with the present invention, since the conductivity of a given sheet electrode will be highly dependent on the coating conditions.

As stated earlier, it should be obvious to one skilled in the art that the fringe field filtering effects described herein are not limited to rotating element sheet materials. Indeed, any electro-sensitive or electro-optical sheet materials addressed by a stylus or stylus array will experience the saturation aspect depicted in FIG. 17.

VI. CONCLUSION

Methods and apparatus consistent with the present invention can be used to address a display medium in order to produce a saturated aspect. The foregoing description of an implementation of the invention with rotating element sheet material has been presented for purposes of illustration and description. It is not exhaustive and does not limit the invention to the precise form disclosed. Modifications and variations are possible in light of the above teachings or may be acquired from practicing the invention. For example, some of the examples used the spectrum associated with visible light as the electromagnetic energy of interest. However, the use of any electromagnetic energy, including infrared, ultraviolet and x-rays as the electromagnetic energy of interest is consistent with the present invention. Still further, FIGS. 14–17 depict rotatable elements that are generally spherical. However, the rotatable elements may be fabricated in any number of shapes. In a more general sense, the fringe-field filtering effects described herein may be used with any electro-sensitive or electro-optical sheet materials addressed by a stylus or stylus array. Thus, a sheet material that comprises electrophoretic particles dispersed in colored liquid, as described by Ota and others, as in I. Ota, et al., IEEE Conference on Display Devices, 72 CH 0707-0-ED 1972, p. 46, or microencapsulated electrophoretic particles dispersed in colored liquid as described by Comiskey et al. (1997) in "Electrophoretic Ink: A printable Display Material," SID 97 Digest, 75–76, will also benefit in the same manner as a sheet material that comprises rotatable elements. Likewise these benefits will accrue to liquid crystal sheet materials. Accordingly, the invention is not limited to the above described embodiments, but instead is defined by the appended claims in light of their full scope of equivalents.

What is claimed is:

1. A display kit comprising:

an addressable display medium configured to exhibit a first aspect under the influence of an addressing vector field in a first direction at an addressing magnitude; and an addressor;

where said addressor is configured to provide said addressing vector field in said first direction at said addressing magnitude to a portion of said display medium; and a filter comprising:

a first sheet electrode and a second sheet electrode configured to exhibit a first vector field in said first direction at a first magnitude;

where said first magnitude is less than said addressing magnitude;

where said display medium is between said first sheet electrode and said second sheet electrode; and where said first sheet electrode is between said addressor and said display medium.

2. The display kit of claim 1 further comprising:

a grounding sheet;

where said grounding sheet is configured with said addressor to provide said addressing vector field in said first direction at said addressing magnitude to said portion of said display medium; and where said second sheet electrode is between said grounding sheet and said display medium.

3. The display kit of claim 2, where said first sheet electrode comprises a coating applied to a first material selected from the group consisting of: glass and plastic; and where said coating comprises a second material selected from the group consisting of: gold, gold-alloys, platinum, and platinum-alloys.

4. The display kit of claim 3, where said coating has a thickness substantially equal to 100 Angstroms.

5. The display kit of claim 1, where said first sheet electrode comprises a coating applied to a first material selected from the group consisting of: glass and plastic; and where said coating comprises a second material selected from the group consisting of: gold, gold-alloys, platinum, and platinum-alloys.

6. The display kit of claim 5, where said coating has a thickness substantially equal to 100 Angstroms.

7. Rotating element sheet material comprising:

a plurality of rotatable elements disposed in a substrate and in contact with an enabling fluid; and a first sheet electrode and a second sheet electrode configured to exhibit a first vector field between them;

where the first vector field is oriented in a first direction;

where said substrate is located between said first sheet electrode and said second sheet electrode;

where at least one of said plurality of rotatable elements is configured to present a first aspect in a first orientation and a second aspect in a second orientation;

where said rotatable element in contact with said enabling fluid is further configured to exhibit an addressing dipole configured to respond to an external vector field;

where said addressing dipole is configured such that said rotatable element exhibits a first aspect under the influence of said external vector field in said first direction;

where said first sheet electrode is configured to lie between said substrate and a source of said external vector field;

where said rotatable element, said enabling fluid, and said substrate are configured to exhibit a work function equal to the energy required to rotate and move said rotatable element from a rest orientation and position; and where an energy coupling between said first vector field and said addressing dipole is less than said work function and greater than zero.

8. The rotating element sheet material of claim 7 further comprising:

a grounding sheet configured to exhibit a fixed vector field potential;

where the second sheet electrode is between said grounding sheet and said substrate.

9. A kit comprising:

the rotating element sheet material of claim 7; and a stylus configured to provide said external vector field in said first direction to a portion of said rotating element sheet material;

where an energy coupling between said external vector field and said addressing dipole is greater than or equal to said work function.

10. A kit comprising:

the rotating element sheet material of claim 8; and a stylus configured to provide said external vector field in said first direction between a distal end of the stylus and said grounding sheet;

where an energy coupling between said external vector field and said addressing dipole is greater than or equal to said work function.

11. The rotating element sheet material of claim 7, where said first sheet electrode comprises a coating applied to a first material selected from the group consisting of: glass and plastic; and where said coating comprises a second material selected from the group consisting of: gold, gold-alloys, platinum, and platinum-alloys.

12. The rotating element sheet material of claim 11, where said coating has a thickness substantially equal to 100 Angstroms.

13. Rotating element sheet material comprising:

a plurality of rotatable elements disposed in a substrate and in contact with an enabling fluid; and a first sheet electrode and a second sheet electrode configured to exhibit a first vector field between them;

where said substrate is located between said first sheet electrode and said second sheet electrode;

where at least one of said plurality of rotatable elements is configured to present a first aspect in a first orientation and a second aspect in a second orientation;

where said rotatable element in contact with said enabling fluid is further configured to exhibit an addressing dipole configured to respond to an external vector field;

where said addressing dipole is configured such that said rotatable element exhibits a first aspect under the influence of said external vector field in a first direction;

where said rotatable element, said enabling fluid, and said substrate are configured to exhibit a work function equal to the energy required to rotate and move said rotatable element from a rest orientation and position;

where an energy coupling between said first vector field and said addressing dipole is less than said work function and greater than zero;

where said first sheet electrode comprises a coating applied to a first material selected from the group consisting of: glass and plastic; and where said coating comprises a second material selected from the group consisting of: gold, gold-alloys, platinum, and platinum-alloys.

14. The rotating element sheet material of claim 13, where said coating has a thickness substantially equal to 100 Angstroms.

15. A method for addressing a display medium, comprising:

providing an addressable display medium configured to exhibit a first aspect under the influence of an addressing vector field in a first direction at an addressing magnitude; and providing an addressor;

where said addressor is configured to provide said addressing vector field in said first direction at said addressing magnitude to a substantially localized region of width w of said display medium; and providing a first sheet electrode and a second sheet electrode configured to exhibit a first vector field in said first direction at a first magnitude;

where said first sheet electrode has a resistivity equal to R ohms per square; and where said first magnitude is less than said addressing magnitude;

where said display medium is located between said first sheet electrode and said second sheet electrode;

where said first sheet electrode, said second sheet electrode, and said display medium together exhibit a capacitance per unit area equal to C; and where said first sheet electrode is between said addressor and said display medium; and providing said addressing vector field to said substantially localized region of width w moving with a speed substantially equal to $1/(wRC)$.

16. The method for addressing a display medium of claim 15, where said first sheet electrode comprises a coating applied to a first material selected from the group consisting of: glass and plastic; and where said coating comprises a second material selected from the group consisting of: gold, gold-alloys, platinum, and platinum-alloys.

17. The method for addressing a display medium of claim 16,
where said coating has a thickness substantially equal to 100 Angstroms.

18. The method for addressing a display medium of claim 15, further comprising:
providing a grounding sheet;
where said grounding sheet is configured with said addressor to provide said addressing vector field in said first direction at said addressing magnitude to said substantially localized region of width w of said display medium; and
where said second sheet electrode is between said grounding sheet and said display medium.

19. A method for addressing rotating element sheet material, comprising:
providing rotating element sheet material,
providing a stylus;
where said stylus is configured to provide an addressing vector field in a first direction at an addressing magnitude to a substantially localized region of width w of said rotating element sheet material; and
providing a first sheet electrode and a second sheet electrode configured to exhibit a first vector field between them;
where said rotating element sheet material comprises:
a plurality of rotatable elements disposed in a substrate and in contact with an enabling fluid;
where said substrate is between said first sheet electrode and said second sheet electrode;
where said first sheet electrode is between said stylus and said substrate;
where at least one of said plurality of rotatable elements in contact with said enabling fluid is further configured to exhibit an addressing dipole configured to respond to said addressing vector field;
where the addressing dipole is configured such that said rotatable element exhibits a first aspect under the influence of said addressing vector field in said first direction at said addressing magnitude; and
where said rotatable element, said enabling fluid, and said substrate are configured to exhibit a work function equal to the energy required to rotate and move said rotatable element from a rest orientation and position;
where an energy coupling between said first vector field and said addressing dipole is less
than said work function and greater than zero;
where said first sheet electrode has a resistivity equal to R ohms per square;
where said first sheet electrode, said second sheet electrode, and said rotating element sheet material together exhibit a capacitance per unit area equal to C; and
moving said stylus with a speed substantially equal to 1/(wRC) such that the addressing vector field couples to said rotatable element.

20. The method for addressing rotating element sheet material of claim 19, further comprising:
providing a grounding sheet;
where said grounding sheet is configured with said stylus to provide said addressing vector field in said first direction at said addressing magnitude to said substantially localized region of width w of said rotating element sheet material; and
where said second sheet electrode is between said grounding sheet and said substrate.

21. The method for addressing rotating element sheet material of claim 19,
where said first sheet electrode comprises a coating applied to a first material selected from the group consisting of: glass and plastic; and
where said coating comprises a second material selected from the group consisting of: gold, gold-alloys, platinum, and platinum-alloys.

22. The method for addressing rotating element sheet material of claim 21,
where said coating has a thickness substantially equal to 100 Angstroms.

* * * * *